US011054574B2

(12) United States Patent
Brusberg et al.

(10) Patent No.: US 11,054,574 B2
(45) Date of Patent: Jul. 6, 2021

(54) METHODS OF SINGULATING OPTICAL WAVEGUIDE SHEETS TO FORM OPTICAL WAVEGUIDE SUBSTRATES

(71) Applicant: CORNING RESEARCH & DEVELOPMENT CORPORATION, Corning, NY (US)

(72) Inventors: Lars Martin Otfried Brusberg, Corning, NY (US); Davide Domenico Fortusini, Painted Post, NY (US); Jason Grenier, Corning, NY (US); Sergio Tsuda, Horseheads, NY (US); Kristopher Allen Wieland, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 41 days.

(21) Appl. No.: 16/414,199

(22) Filed: May 16, 2019

(65) Prior Publication Data
US 2020/0363583 A1 Nov. 19, 2020

(51) Int. Cl.
*G02B 6/10* (2006.01)
*G02B 6/12* (2006.01)
(Continued)

(52) U.S. Cl.
CPC .............. *G02B 6/10* (2013.01); *B23K 26/064* (2015.10); *G02B 5/1871* (2013.01); *G02B 6/34* (2013.01); *B23K 2103/54* (2018.08)

(58) Field of Classification Search
CPC .......... G02B 6/10; G02B 5/1871; G02B 6/34; G02B 6/122; B23K 26/064;
(Continued)

(56) References Cited

U.S. PATENT DOCUMENTS

| 6,423,930 B1 | 7/2002 | Matsumoto |
| 6,928,216 B2 | 8/2005 | Murali et al. |

(Continued)

FOREIGN PATENT DOCUMENTS

| JP | 2020-017592 A | 1/2020 |
| TW | 201828410 A | 8/2018 |

OTHER PUBLICATIONS

Brusberg et al; "Large Optical Backplane With Embedded Graded-Index Glass Waveguides and Fiber-Flex Termination," J. Lightwave Technol. 34, 2540-2551 (2016.
(Continued)

*Primary Examiner* — Kaveh C Kianni
*Assistant Examiner* — Hung Q Lam
(74) *Attorney, Agent, or Firm* — Grant A. Gildehaus

(57) ABSTRACT

The methods of singulating an optical waveguide sheet that supports sheet optical waveguides include irradiating the optical waveguide sheet with a focused laser beam comprising ultrafast light pulses to form within the body of the optical waveguide sheet modified regions, which along with unmodified regions, that define a singulation line. The modified regions define modified sections that are spaced apart by the unmodified sections, which reside at locations of the sheet optical waveguides. The optical waveguide sheet is separated along the singulation line to form an optical waveguide substrate with substrate waveguides formed by sections of the sheet optical waveguides. The optical waveguide substrate has an end face with both smooth and rough sections. The substrate waveguides have end surfaces that terminate at the smooth sections, thereby enabling low-loss optical coupling to other optical components.

47 Claims, 22 Drawing Sheets

(51) Int. Cl.
*G02B 6/28* (2006.01)
*G02B 6/26* (2006.01)
*G02B 6/42* (2006.01)
*B23K 26/064* (2014.01)
*G02B 5/18* (2006.01)
*G02B 6/34* (2006.01)
*B23K 103/00* (2006.01)

(58) Field of Classification Search
CPC ............ B23K 2103/54; B23K 26/0853; B23K 26/0624; B23K 26/0006; B23K 26/53; C03B 33/0222
USPC ................................. 385/14, 24, 50, 129–132
See application file for complete search history.

(56) References Cited

U.S. PATENT DOCUMENTS

| | | | |
|---|---|---|---|
| 7,396,742 | B2 | 7/2008 | Fukuyo et al. |
| 9,296,066 | B2 | 3/2016 | Hosseini et al. |
| 9,815,730 | B2 | 11/2017 | Marjanovic et al. |
| 2008/0130698 | A1* | 6/2008 | Bessho ................. B82Y 20/00 372/45.01 |
| 2009/0148975 | A1 | 6/2009 | Kohda |
| 2013/0126573 | A1 | 5/2013 | Hosseini et al. |
| 2014/0083983 | A1 | 3/2014 | Zhang et al. |
| 2015/0089977 | A1 | 4/2015 | Li |
| 2015/0136743 | A1 | 5/2015 | Hosseini |
| 2015/0165563 | A1 | 6/2015 | Manley et al. |
| 2015/0166393 | A1 | 6/2015 | Marjanovic et al. |
| 2015/0166395 | A1* | 6/2015 | Marjanovic ........ B23K 26/0613 428/131 |
| 2017/0189991 | A1 | 7/2017 | Gollier et al. |
| 2017/0259375 | A1 | 9/2017 | Kumkar et al. |
| 2018/0301866 | A1* | 10/2018 | Singer ................. H01S 5/02276 |
| 2020/0091675 | A1* | 3/2020 | Kawasaki ............... H01S 5/323 |

OTHER PUBLICATIONS

Brusberg et al; "Optical Backplane for Board-To-Board Interconnection Based on a Glass Panel Gradient-Index Multimode Waveguide Technology," 2013 IEEE 63rd Electronic Components and Technology Conference, Las Vegas, NV, 2013, pp. 260-267.

Dudutis et al; "Modification of Glass Using an Axicon-Generated Non-Symmetrical Bessel-Gaussian Beam." Proc. of SPIE vol. 10091. 2017.

Hendricks et al; "Latest Advances in Machining of Transparent, Brittle Materials Using Non-Ablative Femtosecond Laser Processing From Spectra-Physics." Frontiers in Ultrafast Optics. Biomedical, Scientific, and Industrial Applications XVII. vol. 10094. International Society for Optics and Photonics, 2017.

International Search Report and Written Opinion of the International Searching Authority; PCT/US2020/031768; dated Aug. 4, 2020; 16 Pages; European Patent Office.

* cited by examiner

METHODS OF SINGULATING OPTICAL WAVEGUIDE SHEETS TO FORM OPTICAL WAVEGUIDE SUBSTRATES

FIELD

The present disclosure relates to singulating optical waveguide sheets to form optical waveguide substrates.

BACKGROUND

Optical waveguides can be supported by substrates to form optical waveguide substrates. The typical fabrication process for forming the optical waveguide substrates includes forming the optical waveguides in a relatively large glass sheet, such as a glass wafer having a diameter of 15 cm and a thickness of about 0.7 mm. The optical waveguide sheet is then cut into the smaller optical waveguide substrates, such as square substrates (dies) typically having relatively small dimensions, e.g., on the order of 3 mm×3 mm.

The process of dividing the optical waveguide sheet into multiple optical waveguide substrates is called singulation. The individual (singulated) optical waveguide substrates can then be used to form waveguide-based devices, such as optical interconnects, light applications and optical sensors. This requires that the optical waveguides of the substrates be accessible for optical coupling to other optical waveguides (e.g., optical fibers) of another waveguide-based device.

Singulation is used to form optical waveguide substrates for two main reasons. The first main reason is that it is more cost-effective to form a larger optical waveguide sheet and then divide it into smaller substrates than to individually form the substrates.

The second main reason is that the methods used to create the optical waveguides are, in general, not capable of extending the optical waveguide all the way to the edge of the glass-based substrate. It is thus necessary to cut the glass-based sheet after the optical waveguides have been created to access the ends of the optical waveguides.

The optical waveguide substrates and the singulation methods used to form them typically need to meet stringent requirements if the substrates are to be used in commercial optical waveguide devices. The requirements can include the following: 1) small sizes, e.g., 1 mm×2 mm or 2 mm×2 mm or 2 mm×3 mm); 2) high dimensional accuracy, e.g., to tolerances of ±10 µm or ±5 µm; 3) high end-face quality of the optical waveguides, including facet angle and surface finish; 4) free-form singulation to provide shapes other than rectangular or square, and to provide features (e.g., cut-outs) to define alignment and/or securing features; 5) low-cost, high-volume production.

Existing singulation methods can meet some but not all of the above requirements, and such limitations inhibit the use of glass-based optical waveguide substrates in optical waveguide devices.

SUMMARY

The methods of singulating an optical waveguide sheet that supports sheet optical waveguides include irradiating the optical waveguide sheet with a focused laser beam comprising ultrafast light pulses to form within the body of the optical waveguide sheet modified regions, which along with unmodified regions, that define a singulation line. The modified regions define modified sections that are spaced apart by the unmodified sections, which reside at locations of the sheet optical waveguides. The optical waveguide sheet is separated along the singulation line to form an optical waveguide substrate with substrate waveguides formed by sections of the sheet optical waveguides. The optical waveguide substrate has an end face with both smooth and rough sections. The substrate waveguides terminate at the smooth sections, thereby enabling low-loss optical coupling to other optical components.

Embodiments of the singulation methods disclosed herein can include one or more of the following:

A "single irradiation" approach wherein the focus region defined by a focused laser beam has an axial length equal to or greater than the thickness of the optical waveguide sheet so that the focused laser beam can be moved to different (x,y) locations on the sheet without having to be moved axially (i.e., in the z-direction) through the body of the sheet when forming the modified regions.

A "single-pass" approach that comprises performing a single pass of the focused region over a first path in the axial direction through at least a portion of the body of the glass-based optical waveguide sheet when forming a modified region, wherein the first path avoids crossing an optical waveguide;

A "multiple pass" approach that comprises performing a first pass of a focused laser over a first path in the axial direction through a portion of the body of the glass-based optical waveguide sheet and then performing a second pass over the second path that traverses the first path when forming a modified region, wherein neither the first or second paths crosses an optical waveguide;

Controlled crack propagation with the cracks generated by adjacent modified regions, with the cracks residing in the space between adjacent optical waveguides;

Defining a singulation line in a glass-based optical waveguide sheet by forming a series of modified regions therein in a manner that defines unmodified regions at the locations of the optical waveguides, so that upon singulation the resulting optical waveguide substrate has an end face with a smooth section associated with the unmodified regions, and wherein end faces of the waveguides of the optical waveguide substrate ("substrate waveguides") reside in the smooth section.

Using light-blocking members on the top surface of the glass-based optical waveguide sheet at the location of the optical waveguides to define the unmodified regions when processing the glass-based optical waveguide sheet with the focused laser beam.

Performing additional laser-based processing (post-processing) to form additional features (e.g., alignment features) or to process a surface that is not originally of optical quality to make it optical quality.

Defining the singulation line in a free-form manner so that the resulting optical waveguide substrate can have a variety of shapes, including at least one side that is curved, and also including features in the form of corner cut-outs, rounded corners, internal cut-outs, edge recesses, etc.

Effecting the singulation by breaking the processed glass-based optical waveguide sheet by direct mechanical force or by the localized application of heat to the singulation lines to cause thermal expansion and/or thermal stress that causes the glass-based optical waveguide to separate along the singulation line.

The singulation methods disclosed herein are relatively fast. In an example, the singulation line can be formed at speeds in the range from 100 millimeters per second to 3 meter per second, with the top speed limited by the stage speed.

The methods are application to optical waveguide sheets that include layers or coatings on the top and/or bottom surfaces.

The methods are also application to a wide range of materials used for the sheet. Example materials include glass, glass-ceramics and crystalline materials. Example glasses can include soda-lime, borosilicate, germanosilicate, aluminosilicate ion-exchanged (IOX) glasses, non-ion-exchanged glasses, chalcogenide glasses and fused silica. Example crystals can include sapphire, diamond, lithium niobate, lithium tantalite, lithium triborate, Barium borate, silicon, InP, GaAs. IOX glasses include compressive stress layer that can help to define cracks along the singulation line. The compression stress layer can be over the full area or localized (e.g. only along the singulation line). An example sheet can be chemically strengthened, wherein the chemical strengthening can be localized or can be throughout the body of the sheet.

An embodiment of the disclosure is a method of forming a singulation line in an optical waveguide sheet having a body that defines opposite first and second surfaces and that supports at least one sheet optical waveguide at a waveguide location, comprising: irradiating the optical waveguide sheet with a focused laser beam at discrete locations along an irradiation path by passing the focused laser beam through the first surface at the discrete locations to form spaced apart modified regions that extend from at least one of the first surface and the second surface and into the body of the optical waveguide sheet, wherein the spaced apart modified regions define at least one modified section of the optical waveguide sheet; leaving at least one section of the optical waveguide sheet along the irradiation path at the waveguide location unmodified to define at least one unmodified section; and wherein the singulation line is formed by the at least one modified section and the at least one unmodified section of the optical waveguide sheet.

Another embodiment of the disclosure includes separating the optical waveguide sheet along the singulation line to form an optical waveguide substrate comprising: an end face residing substantially at the location of the singulation line and having at least one first section with a first surface roughness at the at least one unmodified section and a second section with a second surface roughness at the at least one modified section, wherein the second surface roughness is greater than the first surface roughness as measured by a surface standard according to ASME B46.1; and at least one substrate optical waveguide constituted by a section of the at least one sheet optical waveguide, the at least one substrate optical waveguide comprising opposite first and second surfaces and a waveguide end surface at the at least one first section of the end face.

Another embodiment of the disclosure is a method of singulating an optical waveguide sheet having a body that defines first and second opposite surfaces and that supports a plurality of sheet waveguides, comprising: forming in the body of the optical waveguide sheet spaced apart modified regions at discrete locations along an irradiation path using a focused laser beam comprising optical pulses with a temporal pulse width of less than 100 picoseconds directed through the first surface to define a singulation line that crosses the plurality of sheet waveguides, wherein the spaced apart modified regions do not intersect any of the plurality of sheet waveguides; separating the optical waveguide sheet along the singulation line to form an optical waveguide substrate comprising an end face and that further comprises sections of the plurality of sheet waveguides that define substrate optical waveguides each having a waveguide end surface that resides at the end face, wherein the substrate end face comprises a first section at which the waveguide end surfaces reside and a second section at which the waveguide end surfaces do not reside; and wherein first and second sections comprise respective first and second average surface roughnesses, and wherein the second average surface roughness is at least two times greater than the first average surface roughness as measured by a surface standard according to ASME B46.1.

Another embodiment of the disclosure is an optical waveguide sheet product having a body that defines opposite first and second surfaces and that supports at least one sheet optical waveguide at a waveguide location, formed by the process comprising: forming in the body of the optical waveguide sheet spaced apart modified regions at discrete locations along an irradiation path using a focused laser beam comprising optical pulses with a temporal pulse width of less than 100 picoseconds directed through the first surface to define a singulation line that crosses the plurality of sheet waveguides, wherein the spaced apart modified regions do not intersect any of the plurality of sheet waveguides; separating the optical waveguide sheet along the singulation line to form an optical waveguide substrate comprising an end face and that further comprises sections of the plurality of sheet waveguides that define substrate optical waveguides each having a waveguide end surface that resides at the end face, wherein the substrate end face comprises a first section at which the waveguide end surfaces reside and a second section at which the waveguide end surfaces do not reside; and wherein first and second sections comprise respective first and second average surface roughnesses, and wherein the second average surface roughness is at least two times greater than the first average surface roughness as measured by a surface standard according to ASME B46.1.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1A:
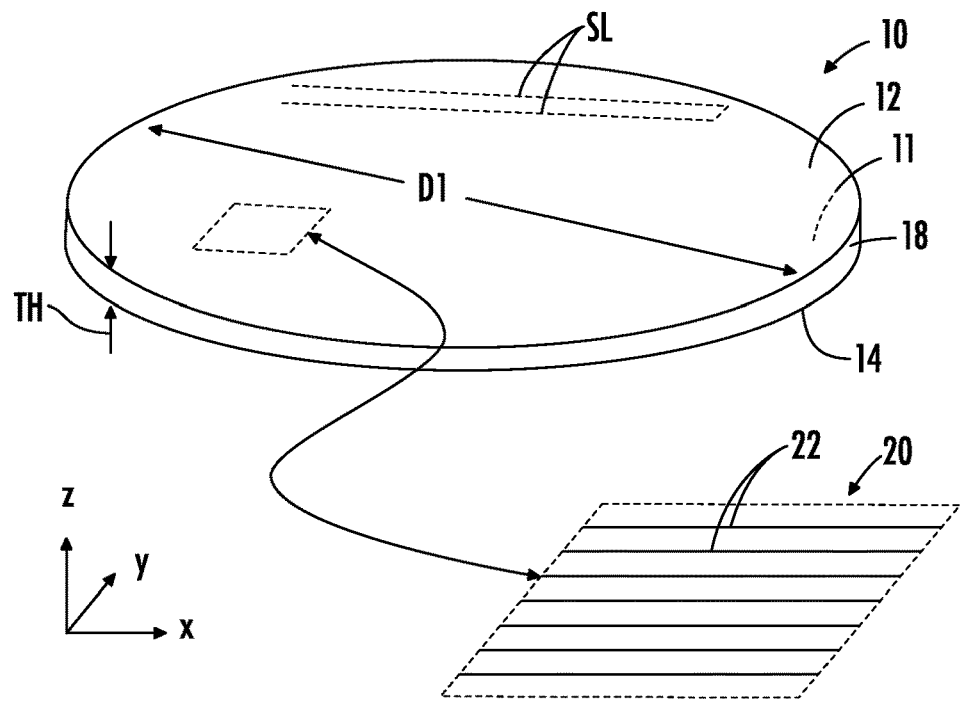
FIG. 1A is an elevated view of an example glass-based optical waveguide sheet, with the close-up inset showing an array of optical waveguides ("sheet waveguides") supported by the sheet.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The following documents are incorporated by reference herein and are collectively referred to below as the Bessel beam references: U.S. Patent Application Publication No. 2015/0165563 A1; U.S. Patent Application Publication No. 2015/0166393 A1; U.S. Patent Application Publication No. 2017/0189991 A1.

The term "singulation line" is used herein as representing a path along which optical waveguide sheet can be cleanly separated (as opposed to being fractured), i.e., a separation path. The term "line" can mean the substantially one-dimensional manifestation of the separation path at a surface of the optical waveguide sheet, or can mean the substantially two-dimensional manifestation of the separation path formed within the body of the optical waveguide sheet using the systems and methods described herein.

The term "optical quality" as used herein, as in reference to a surface (including a surface finish or a surface flatness or surface roughness) means that the surface is capable of transmitting light with sufficiently low loss for use in commercial optical coupling applications. In an example, an optical quality surface has an average surface roughness Ra as measured per the surface texture standard ASME B46.1 set forth by the American Society of Mechanical Engineers. Reference to an average surface roughness Ra is based on this ASME standard unless otherwise noted. In an example, the optical quality surface discussed below has an average surface roughness Ra<0.01 micron. In another example, an optical quality surface is one that enables a coupling loss with another waveguide having the same configuration of less than 3 dB or less than 1 dB or less than 0.5 dB. The term "smooth section" as used herein is a short-hand way of referring to an optical-quality surface while the term "rough section" is a short-hand way of referring to a non-optical-quality surface (e.g., Ra>0.01 micron or Ra>0.05 micron, or Ra>0.1 micron).

In some of the embodiments, cracks are formed in the optical waveguide sheet to define the singulation line. These cracks are shown as wavy lines in some of the Figures (e.g., FIGS. 4 and 9) for illustrative and identification purposes only. In practice, the cracks are substantially straight and form substantially planar end faces upon singulation.

The term "optical waveguide sheet" is used herein to refer a substantially planar member that operably supports one or more optical waveguides. Example optical waveguides sheets can include additional components beyond the one or more optical waveguides. Example optical waveguide sheets include planar lightwave circuits (PLCs), including stacked PLCs, three-dimensional optical circuits, and photonic integrated circuits. The optical waveguides can be formed in one or more rows, etc. The sheet may take the form of a wafer or a rectangular sheet.

Optical Waveguide Sheet

FIG. 1A is an elevated view of an example optical waveguide sheet ("sheet") 10. The sheet 10 has a body 11 that defines a top surface 12, a bottom surface 14 and a perimeter 16. In an example, the body comprises a glass-based material, such as a glass, a glass-ceramic or a crystal. Example glasses can include soda-lime, borosilicate, germanosilicate, aluminosilicate ion-exchanged glasses, non-ion-exchanged glasses, chalcogenide glasses, fused silica. Example crystals can include sapphire, diamond, lithium niobate, lithium tantalite, lithium triborate, Barium borate, silicon, InP, GaAs. An example sheet 10 can be chemically strengthened, wherein the chemical strengthening can be localized ("locally chemically strengthened") or can be throughout the body of the sheet ("fully chemically strengthened"). In an example, the sheet 10 can comprise two or more stacked layers or sub-sheets.

The sheet 10 supports one or more optical waveguides ("sheet waveguides") 22. The close-up inset of FIG. 1A shows an example of an array 20 of sheet waveguides 22. The sheet waveguides 22 are shown running in the x-direction. The sheet waveguides 22 need not all be straight and in other embodiments the sheet waveguides can have bends, run in different directions, terminate at other components, etc.

Figure 1B:
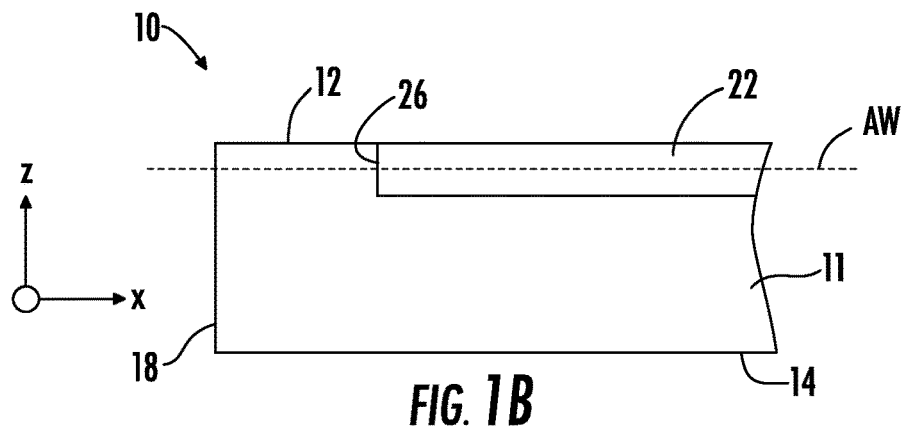
FIG. 1B is a close-up x-z cross-sectional view of a perimeter portion of the optical waveguide sheet taken along one of the sheet waveguides and showing an example where the sheet waveguide does not reach the perimeter of the sheet.

FIG. 1B is a close-up x-z view of a perimeter portion of the sheet 10 showing an example sheet waveguide 22. Each sheet waveguide 22 has a waveguide axis AW and an end surface (facet) 26. The example sheet waveguide 22 of FIG. 1B has an end surface 26 that resides within the body 11 of the sheet 10, i.e., the sheet waveguide 22 does not extend to the perimeter 16 of the sheet 10, as shown in the close-up x-z view of FIG. 1B.

FIG. 1A also shows a portion of an example singulation line SL, which is explained below. The sheet 10 can include other structures and coatings in addition to the sheet waveguides 22, and such structures and coating are omitted for ease of illustration and explanation. In an example, the sheet 10 can comprise a planar lightwave circuit (PLC).

Figure 1C:
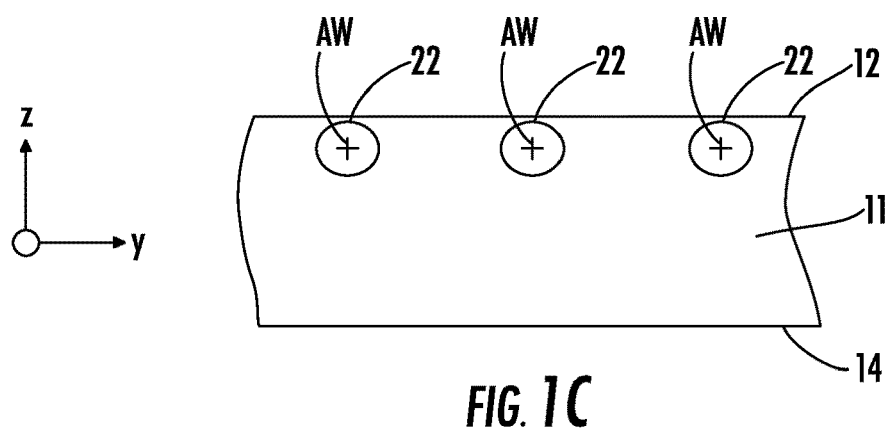
FIG. 1C is a close-up y-z view of an example optical waveguide sheet showing cross-sectional views of three of the sheet waveguides formed in the body immediately adjacent the top surface of the sheet.

FIG. 1C is a close-up y-z cross-sectional view of the sheet 10 showing three sheet waveguides 22 formed in the body 11 proximate the top surface 12. In an example, sheet waveguides 22 can be formed by an ion-exchange process. In another example, the sheet waveguides 22 can be formed using a laser-writing process. In other examples, the sheet waveguides 22 can be formed using an ion-beam milling process, a photolithography process, an electron-beam lithography process, a thin-film deposition process, a lamination process and any other waveguide-forming process known in the art.

Generally, the sheet waveguides 22 defines a localized region in or on the body 11 of increased refractive index relative to the rest of the material that makes up the body. Two example techniques for forming the waveguides 22 include IOX and laser writing. For waveguides 22 formed within the body 11, the surrounding portion of the body 11 and the region immediately adjacent the top surface 12 opposite the body (when the waveguide is at or near the top surface) define a cladding for the sheet waveguide 22. For ease of illustration and discussion, the sheet waveguides 22 considered herein are shown has formed within the body 11 and having a definite boundary with the body.

Figure 1D:
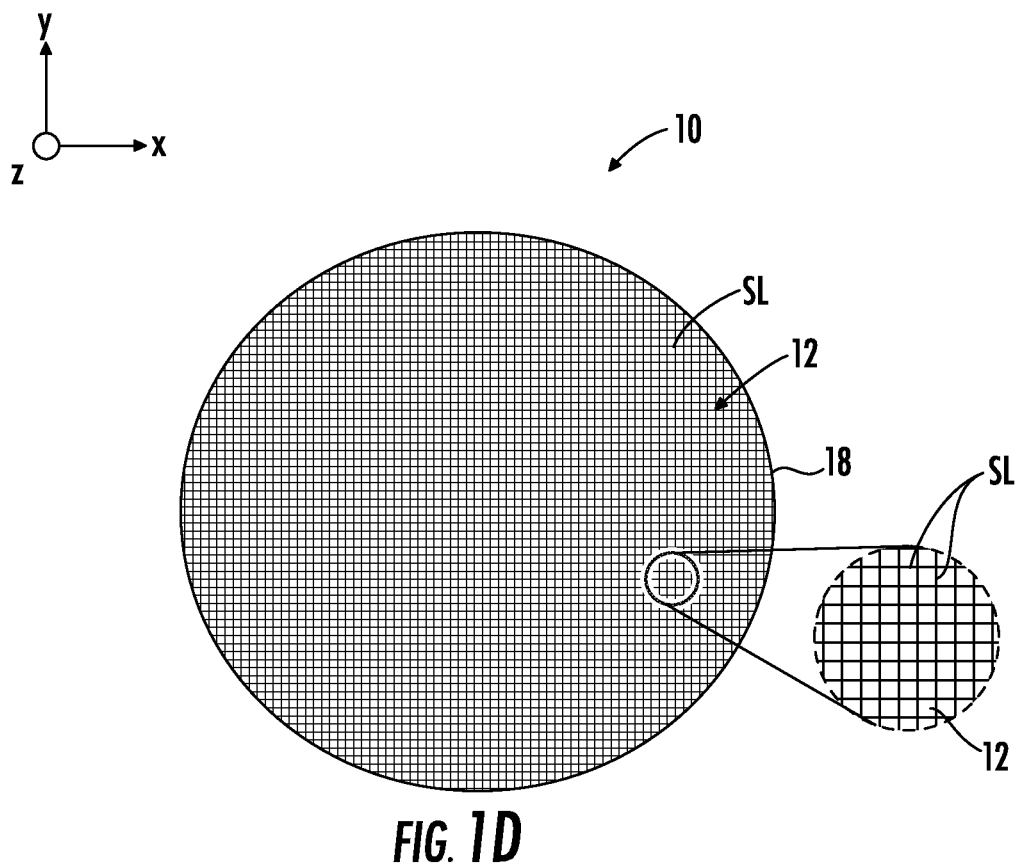
FIG. 1D is a plan view of an example optical waveguide sheet in the form of a wafer and showing an array of singulation lines that run in the x-direction and the y-direction.
Figure 1E:
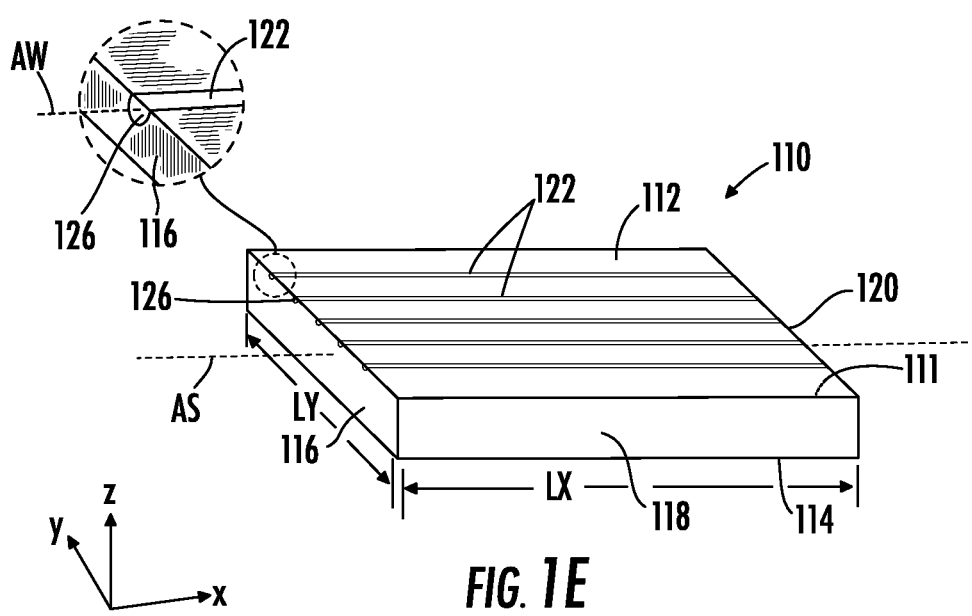
FIG. 1E is an elevated view of an example optical waveguide substrate that shows an array of optical waveguides ("substrate waveguides") as formed from sections of the sheet waveguides and showing a front end-face and a side edge of the optical waveguide substrate.

FIG. 1D is a plan view of the sheet 10 showing an array of singulation lines SL that run in the x-direction and the y-direction. FIG. 1E is an elevated view of an example of a glass-based optical waveguide substrate ("substrate") 110 formed by singulating the sheet 10 along the singulation lines SL of FIG. 1D and as described in greater detail below. The substrate 110 includes a body 111 that defines a top surface 112, a bottom surface 114, a front end face 116, side edges 118 and a back end face 120. The body 111 comprises a portion of the body 11 of the sheet 10, while the top surface 112 comprises a portion of the top surface 12 of the sheet while the bottom surface 114 comprises a portion of the bottom surface 14 of the sheet.

The substrate 110 has central substrate axis AS that runs through the center of the substrate body 111 in the x-direction. The substrate 110 has a length LX in the x-direction and a length LY in the y-direction. The example substrates 110 are shown as having a rectangular shape by way of example and for ease of discussion, but in other examples can have other shapes as described and shown below. Also, the substrates 110 formed by the singulation methods disclosed herein need not all have the same shape and same dimensions.

The substrate 110 also includes substrate waveguides 122, which are sections of the sheet waveguides 22. The substrate waveguides 122 run in the x-direction by way of example. Each sheet waveguide 122 has an end surface 126 (facet) that resides at the front end face 116, as shown in the close-up inset of FIG. 1E. Each sheet waveguide 122 can also have at the back end face 120 of the substrate another end surface (not shown). The discussion below focuses on the front end face 116 of the substrate 110 and the front end surfaces 126 of the substrate waveguides for ease of explanation. The same processing consideration described on connection with the front end face 116 of the substrate 110 can apply to the back end face 120 of the substrate or the side surfaces of the substrate waveguides 122, depending on the particular shape of the waveguide (e.g., straight, curved, one or more bends, etc.).

Laser-Based Optical Processing System

Figure 2:
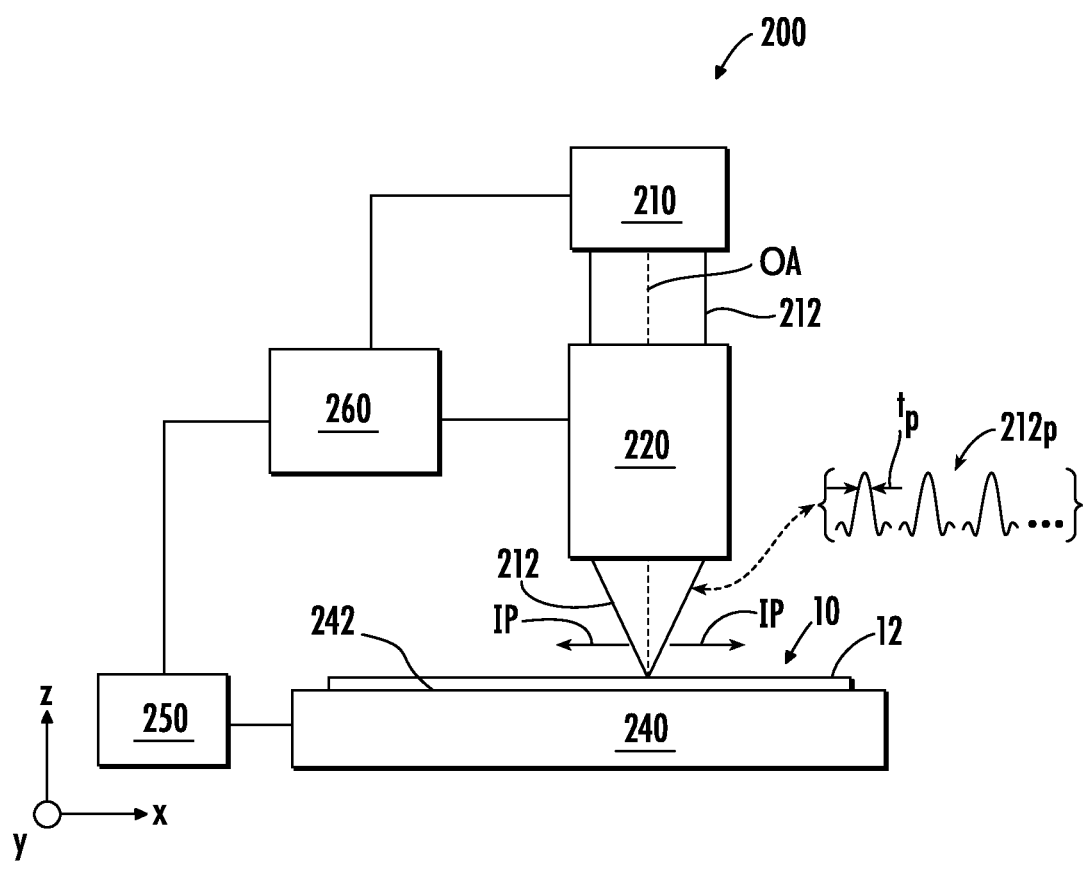
FIG. 2 is a schematic diagram of an example laser-based optical processing system for optically processing the glass-based optical waveguide sheet to perform the singulation methods disclosed herein to form the optical waveguide substrates.

FIG. 2 is a schematic diagram of a laser-based optical system ("system") 200 for laser processing the sheet 10 to carry out the singulation methods described herein. The system 200 includes a laser source 210 that emits a laser beam 212 along an optical axis OA. In an example, the laser source is an ultrafast laser source wherein the laser beam 212 comprises short light pulses 212P, e.g., having a temporal pulse length $t_p$ of less than 100 picoseconds.

The system 200 also includes a focusing lens 220 arranged to receive the laser beam 212 and form a focused laser beam 222. The system 200 also includes a movable support stage 240 that includes a support surface 242 that supports the sheet 10. The movable support stage 240 is operably connected to a stage controller 250 that controls the movement of the support stage 240. The focused laser beam 222 moves relative to the sheet 10 over an irradiation path IP, as described below.

The system 200 also includes a main controller 260 operably connected to the laser source 210, the focusing optical system 220, and the stage controller 240 to control the operation of the system 200 to carry out the singulation methods disclosed herein. In an example, the main controller 260 is configured to perform instructions (e.g., software or firmware) embodied in a non-transitory computer-readable medium to carry out the singulation methods. In an example, the main controller 260 comprises a computer that includes control-based software.

As will be seen below, the operating parameters of the system 200 can be adjusted during the singulation processes. For example, the system 200 can be adjusted to define a first section of a singulation line that is easy to cleave but that does not produce an optical quality cleaved surface and to define a second section of the singulation line to produce an optical quality surface suitable for waveguide end surfaces 26. The operating parameters of the system 200, such as the laser power, power per optical pulse, etc.

Defining the Singulation Line for Singulation

The system 200 is used to define one or more of the singulation lines SL in the sheet 10 so that it can be singulated to form two or more substrates 110. The singulation line SL is formed by selective irradiation of the sheet 10, as described below. The singulation line SL can have different sections, e.g., one or more long straight sections, one or more short straight sections, one or more curved sections, etc., which are referred to below as singulation line features SLF (see FIG. 11A).

Figure 3A:
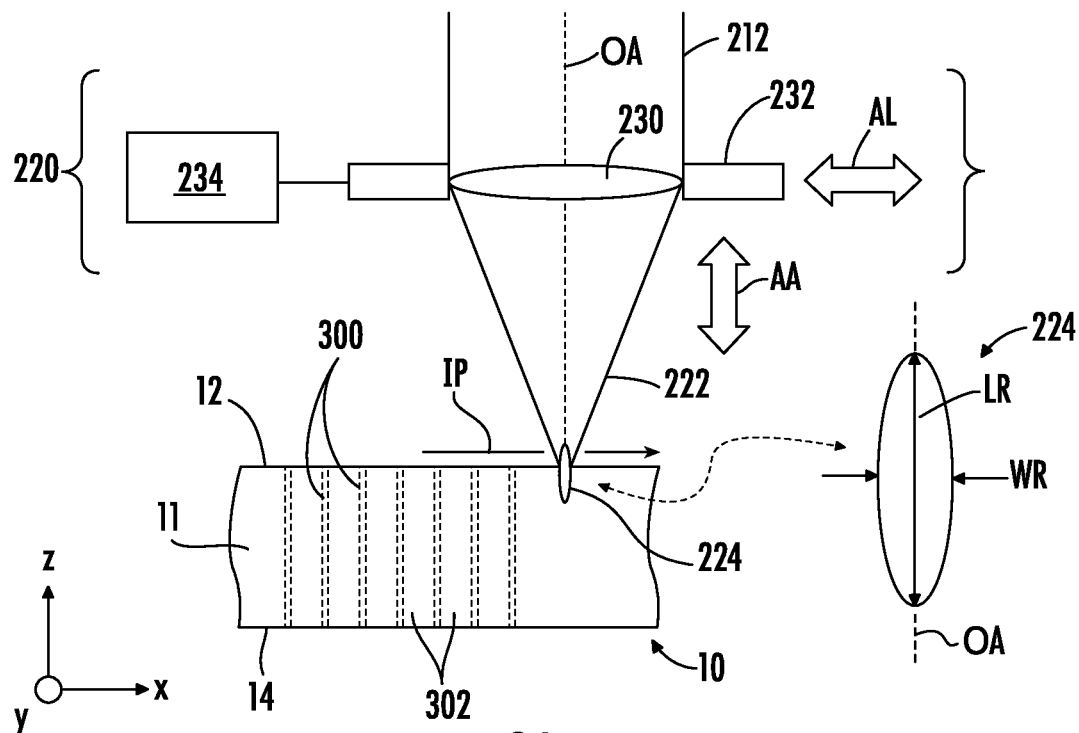
FIGS. 3A through 3C are close-up y-z cross-sectional views of a portion of the optical waveguide sheet and the focusing optical system of the laser-based optical processing system, illustrating the formation of modified regions in the body of the optical waveguide sheet by moving a focus region through the body of the sheet (in the z-direction) at different (x,y) locations to define a singulation line in the optical waveguide sheet (see FIG. 1A).

FIG. 3A is a close-up y-z cross-sectional view of a portion of the sheet 10 and the focusing optical system 220. The focusing optical system 220 is shown as comprising a focusing lens 230 supported by a movable support member 232. The movable support member 232 is operably connected to a support member controller 234, which in turn is operably coupled to the main controller 260. The focusing lens 230 can comprise a single optical element or multiple optical elements. In an example, the focusing lens 230 comprises an axicon lens and the focused laser beam 222 comprises a Bessel beam.

The focused laser beam 222 defines a focus region 224, which in an example has an axis defined by the optical axis OA, an axial length LR and a width WR, as best seen in the close-up inset of FIG. 3A. The focus region 224 is shown in FIG. 3A as located at an initial position at the top surface 12 of the sheet 10. The arrow AL is a lateral movement arrow that indicates relative lateral (x-y) movement of the focusing lens 230 with respect to the sheet 10 when moving to the next irradiation location along the irradiation path IP (see also FIG. 4). Thus, in in example, the focus region 224 irradiates the sheet 10 in a step-and-repeat fashion at discrete locations along the irradiation path IP.

In an example, the focusing lens 230 is laterally stationary and the sheet 10 is moved by moving the movable support stage 240. In one example, the axial length LR of the focus region 224 is equal to or greater than the thickness TH of the sheet 10. In another example, the axial length LR of the focus region 224 is less than the thickness TH of the sheet 10.

Figure 3B:
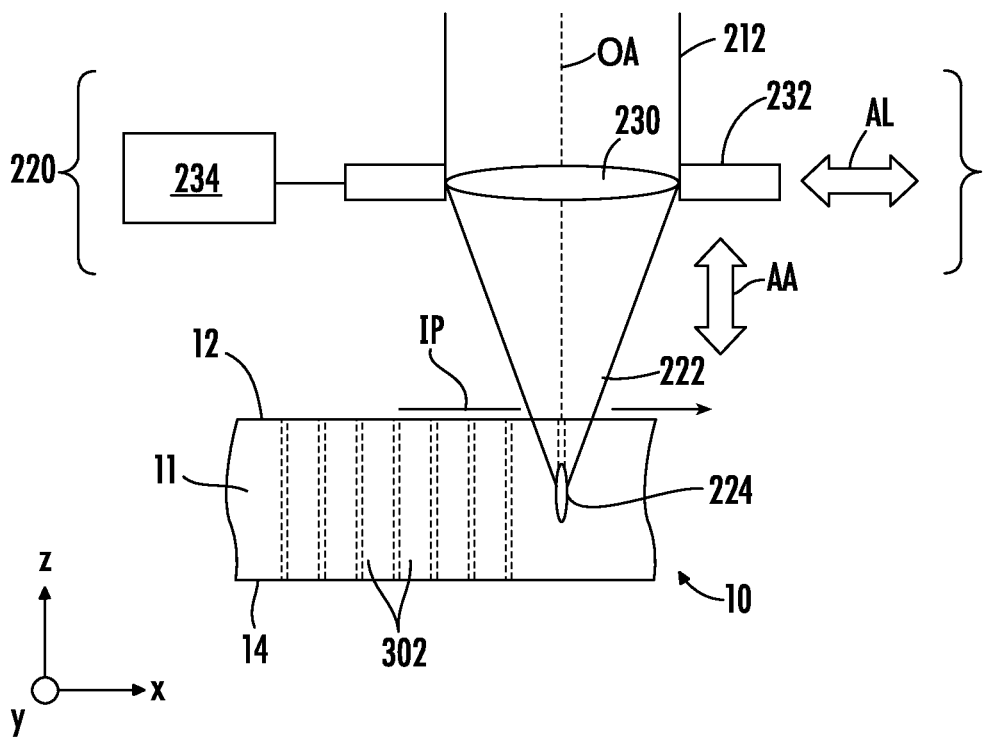
Figure 3C:
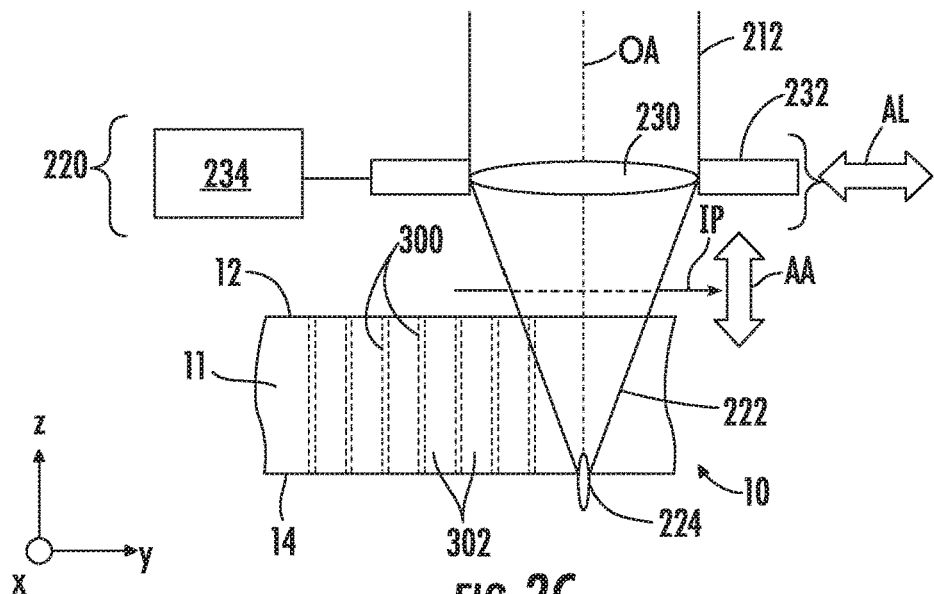

The focus region 224 is defined by an intensity sufficient to substantially modify the material making up the body 11 of the sheet 10 to define a modified region 300, as shown in FIG. 3A. FIGS. 3A through 3C illustrate an example where focus region 224 is moved through the body 11 in the axial direction (z-direction) as indicated by an axial movement arrow AA to define the localized modified regions.

Figure 3D:
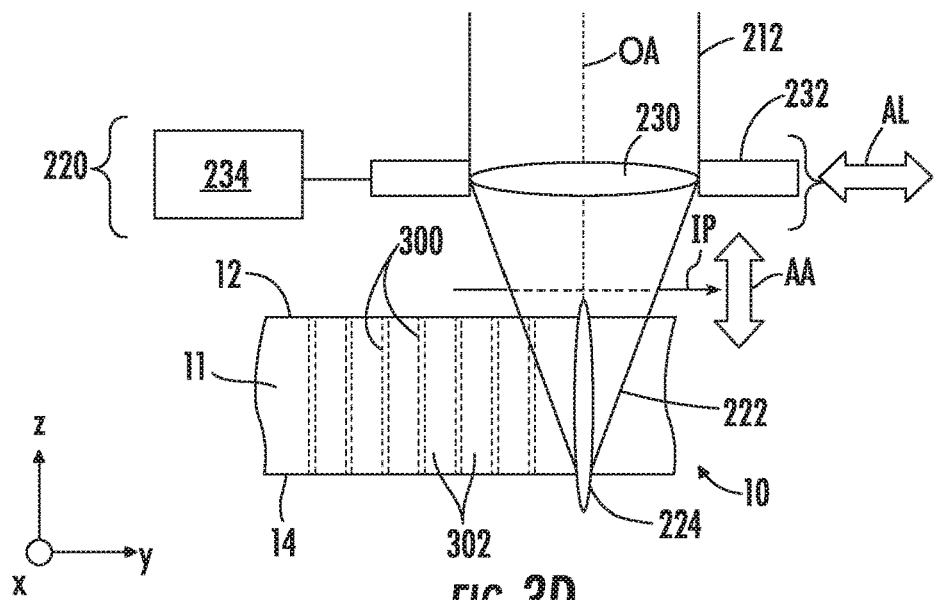
FIG. 3D is similar to FIG. 3A and illustrates an embodiment where the focus region has an axial length that is greater than the thickness of the body of the optical waveguide sheet so that the focus region can remain axially stationary when forming a given modified region.

In cases where the focus region 224 has a relatively large axial length LR (which is the case for a Bessel beam), it may not be necessary to move the focus region 224 through the body 11, depending on the thickness TH of the sheet 10. FIG. 3D is similar to FIG. 3A and illustrates an embodiment where the focus region 224 has an axial length AL greater than the thickness TH of the body 11 of the sheet 10 so that the focus region can remain axially stationary when forming each modified region 300.

The localized modified region 300 can be defined by damage to the material making up the body 11 of the sheet 10. In an example, the localized modified region (hereinafter, "modified region") 300 is defined by a perforation in the body 11. The perforation can be partial or complete, i.e., the modified region 300 can have some material removed or all material removed to form a hole in the body 11 of the sheet 10. The removal of material from body 11 to form a modified region 300 can be accomplished by localized ablation of the material making up the body 11. In another example, the localized modified region 300 is defined by the affected material having substantially reduced structural integrity as compared to the surrounding portions of the body 11.

One or more techniques known in the art can be used to form the localized modified regions using ultrashort light pulses. In one example, the modified regions 300 are defined by laser filamentation and/or photoacoustic compression, as described for example in U.S. Patent Application Publication No. 2015/0136743 and in U.S. Pat. No. 9,296,066, which are both incorporated by reference herein. In other examples, the light beam 212 comprises a quasi-non-diffracting beam to create the focus region 224, such as described in European Patent No. EP 2754524 B1, which is incorporated by reference herein. In yet another example, the focusing optical system 220 can be configured for beam-shaping to create an elongated focus region in the manner described in U.S. Patent Application Publication No. US2017/0259375, which is incorporated herein by reference. In another example, the laser beam machining technique based on multi-photon absorption as described in U.S. Pat. No. 7,396,742, which is incorporated by reference herein, can be employed. Other techniques known in the art can be applied as well, noting that the present disclosure is not directed to such techniques per se but rather the judicious use of such techniques in forming a singulation line in optical waveguide sheets that allows for the formation of optical waveguide substrates having the special features described herein.

Parts of the body 11 that remain unmodified (e.g., between adjacent modified regions 300) after processing the sheet 10 with the focused laser beam 222 and the singulation line SL is formed are referred to as unmodified regions 302. In an example, none of the modified regions coincide with the location of the sheet waveguides 22, i.e., none of the modified regions 300 traverses any of the sheet waveguides. This means that all the sheet waveguides 22 reside one or more unmodified regions.

In example methods that rely on the axial movement of the focus region 224, the axial movement can be one way through the body 11 or can be back and forth along the same axial line (path) or along a different axial line (path).

In an example described below, the modified region 300 can be formed starting at a select depth below the top surface 12, i.e., it need not start at the top surface 12.

Laterally stepping the position of the focused laser beam 222 (or the sheet 10) and repeating either a single stationary exposure or an axial moving exposure using the focus region 224 allows the formation of an array of modified regions 300.

Figure 3E:
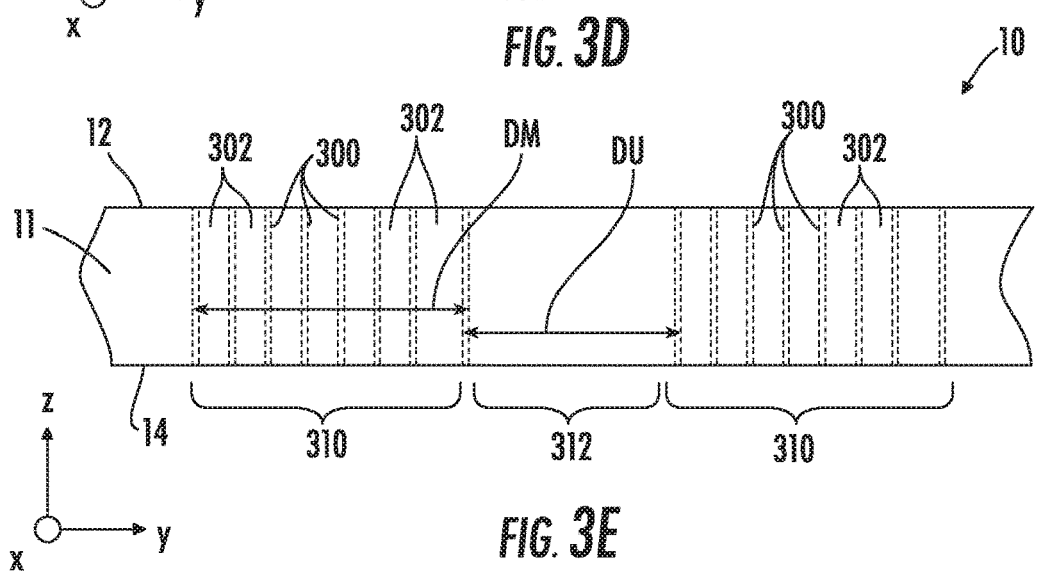
FIG. 3E is a close-up y-z cross-sectional view of an example sheet showing two modified sections separated by an unmodified section, wherein each modified section includes multiple modified regions separated by unmodified regions.

With reference to FIG. 3E, in an example, an array of two or more modified regions 300 defines a modified section 310. The modified sections 310 are defined herein because upon singulation the modified section can be associated with the formation of a rough section of an end face of the sheet 10 or the substrate 110 even if the modified section includes unmodified regions. Modified sections 310 are typically associated with (e.g., defined by) relatively closely spaced modified regions 300, as explained below. In an example, the modified sections have an average surface roughness Ra>0.01 micron or Ra>0.05 micron, or Ra>0.1 micron. Each modified section 310 has a lateral extent (width) DM. For a uniform substrate thickness TH, each modified section 310 has a surface area AM=DM·TH.

Likewise, relatively large unmodified regions 302 are referred to herein as unmodified sections 312 since they are typically associated with formation of relatively large smooth sections of an end face of the sheet 10 or substrate 110, as described below. Each unmodified section 312 has a lateral extent (width) DU. For a uniform substrate thickness TH, each unmodified section 312 has surface area AU=DU·TH.

In an example, the modified sections 310 need not be all of the same size, and the unmodified sections 312 need not all be of the same size. In an example, the unmodified sections 312 have a total surface area (i.e., the sum of all modified surface areas AM) that is no more than 60% of the total surface area as defined by the sum of all of the unmodified surface areas AU and all the modified surface areas AM for the given end face of the sheet 10 or substrate 110.

In examples, the unmodified sections 312 have an average surface roughness Ra<0.01 micron or <0.05 micron. In other examples, the modified sections 310 have an average surface roughness that is at least 10% (1.1×) greater than that of the unmodified sections 312, or that is at least twice (2×) greater than that of the unmodified sections, or at least five times (5×) greater than that of the unmodified sections, or at least ten times (10×) greater than that of the unmodified sections.

FIGS. 3A through 3C show the formation of multiple example modified regions 300 that extend in the z-direction through the body 11 of the sheet 10 from the top surface 12 to the bottom surface 14. The modified regions 300 can have a substantially cylindrical shape and resemble circular perforations having a diameter DR. The array of modified regions 300 so formed constitute an example modified section 310 and also define the singulation line SL (see, e.g., FIG. 1A and FIG. 1D).

Figure 4:
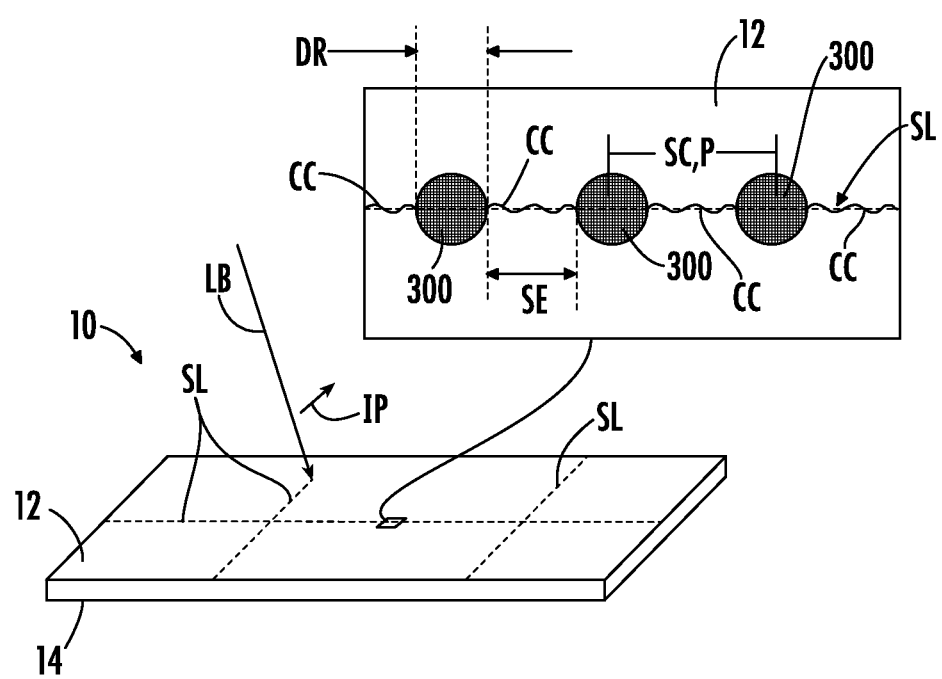
FIG. 4 is an elevated view of a portion of the optical waveguide sheet showing example singulation lines as defined by an array of modified regions, with the close-up inset showing a top-down view of three of the modified regions and the singulation line formed thereby, with cracks running substantially along the singulation line.

FIG. 4 is a top elevated view of an example processed sheet 10 with the close-up inset showing several of the modified regions 300 formed therein. An example diameter DR of a modified region 300 is in the range from 0.1 microns to 10 microns or in the range from 1 to 10 microns. Adjacent modified regions 300 have an edge-to-edge spacing ("edge pacing") SE and a center-to-center spacing ("center spacing") spacing SC that defines a pitch P. In an example, the center spacing SC can be substantially the same while in another example can vary along the singulation line SL. An example edge spacing SE is in the range from 1 micron to 250 microns or from 1 micron to 100 microns, with 10 microns being an example edge spacing SE. In an example, the pitch P between adjacent modified regions 300 can be in the range from 1 to 500 microns and in another example is in the range from 5 microns to 100 microns.

With continuing reference to FIG. 4, the array of modified regions 300 define the singulation line SL, which can be straight (e.g., have a straight portion) or curved (e.g., can comprise a curved portion, have one or more bends, etc.). In an example, the singulation line SL includes cracks CC between adjacent modified region 300, wherein the cracks run substantially along the singulation line SL. In an example, the spacing SE is selected so that stress from forming the damage regions will generate the cracks CC, which facilitate singulation. In an example, the cracks CC can extend 50 microns or longer.

Formation of Substrates by Singulation

The sheet 10 is singulated by separating the sheet along one or more singulation lines SL, e.g., by application of a breaking force, which can be in the form of a breaking stress. A breaking stress can be created by heating the sheet 10 at the location of the singulation line SL. In an example, this is accomplished by irradiating the singulation line with an infrared (IR) laser beam LB (see FIG. 4), e.g., from a $CO_2$ laser. Other means for providing localized heating can also be employed, such as by using a hot plate, an oven or directed heat, such as from a heating gun or flame. Other breaking forces include mechanical force.

Figure 5A:
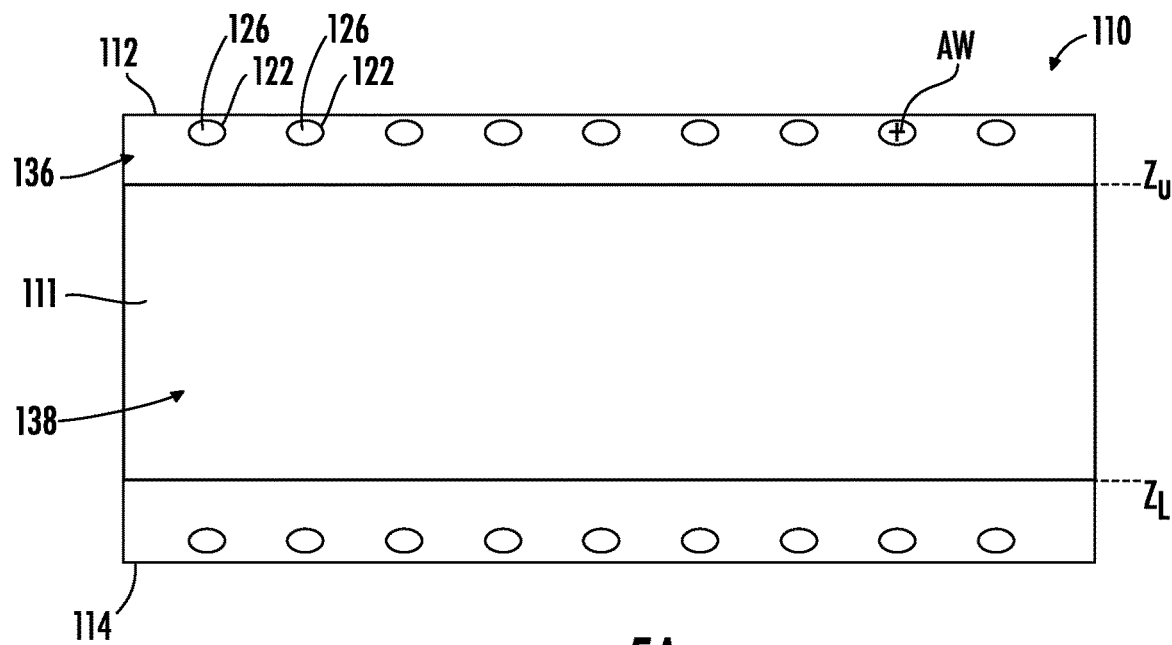
FIG. 5A is an example y-z cross-sectional view of the front end-face of an example optical waveguide substrate formed by singulation, illustrating the formation of a smooth section in the vicinity of the substrate waveguides and a rough section away from the substrate waveguides, wherein the smooth section is associated with unmodified section of the sheet and the rough section is associated with a modified section of the sheet.

FIG. 5A is an example y-z cross-sectional view of the front end face 116 of an example substrate 110. The front end face 116 shows respective smooth sections 136 proximate the upper and lower surface 112 and 114, and a rough section 138 between the smooth sections. The substrate waveguides 122 have end surfaces 126 and also have the waveguide axes AW. In an example, the substrate waveguides 122 can reside proximate the top surface 112 as well as proximate the bottom surface 114 so that the waveguide end surfaces 136 reside in the respective smooth sections 136.

As described above, the smooth sections 136 are associated with unmodified sections 312 of the sheet 10 while the rough sections 138 are associated with the modified sections 310 of the sheet.

The respective amounts of average surface roughness Ra for the smooth section 136 and the rough section 138 can be measured using known techniques. For optical connections that employ one or more substrate waveguide end surfaces 226, ideally the surface roughness is as small as possible to avoid light scattering, e.g., Ra<0.01 micron. It has been found that using a Bessel beam as the focused laser beam 224 results in the rough sections 138 having an average surface roughness Ra>>0.01 micron (e.g., Ra of about 1 micron), which is too rough for most commercial applications.

It is noted that for a singulation line SL that runs parallel to the sheet waveguides 22 of the sheet 10, the resulting side edge 118 of the singulated substrate 110 can be relatively rough (i.e., not have to be of optical quality) since it will not traverse a waveguide and form a waveguide end surface 126 for any of the substrate waveguides 122. On the other hand, if the singulation line SL crosses a sheet waveguide 22, then it will result in a waveguide end surface 126 residing at say the front end face 116 of the substrate 110. It is therefore desirable to ensure that the waveguide end surfaces 126 reside within a smooth section 136.

In an example, the configuration of the front end face 116 of the substrate 110 having a top smooth section 136 closely proximate the upper surface 112 is formed by initiating laser processing of the sheet 10 with the focus region 224 starting at an initial z position $z_U$ below the top surface 12 and proceeding toward the bottom surface 14 of the sheet when forming the modified regions 300.

If there are sheet waveguides 22 at the bottom surface 14 of the sheet 10 such as shown in the example of FIG. 5A, then the laser processing with the focus region 224 can terminate at a final position $Z_L$ close to but not at the bottom surface to place the bottom waveguides in the bottom smooth section 136.

Figure 5B:
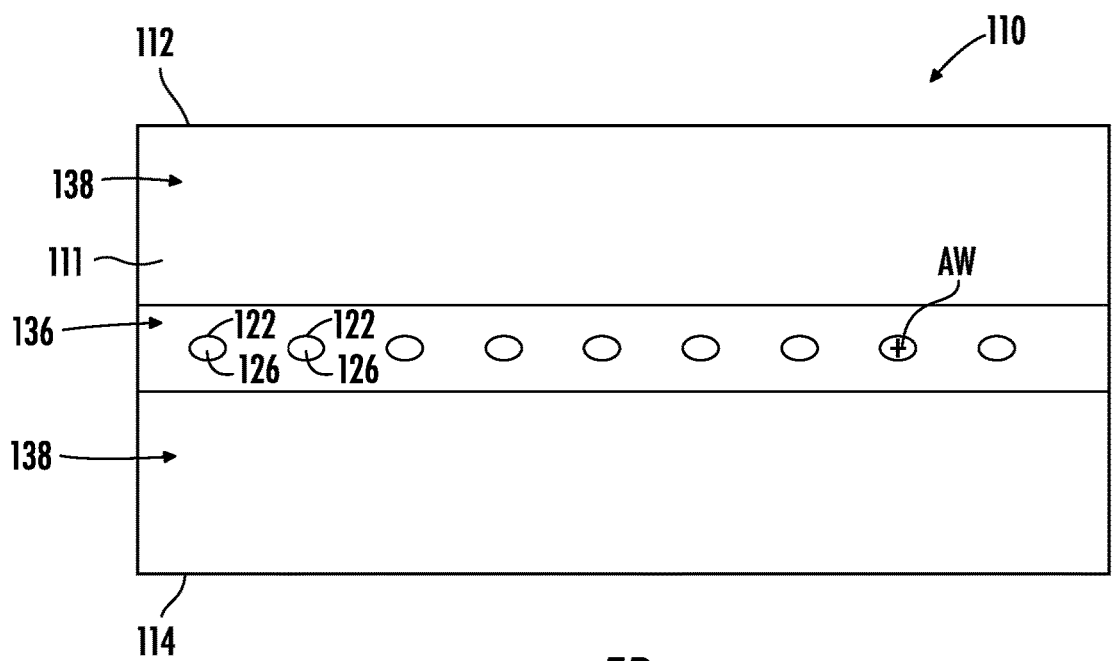
FIG. 5B is similar to FIG. 5A and shows an example optical waveguide substrate where the smooth section resides in the middle of the body of the optical waveguide substrate at the location of the substrate waveguide end surfaces.

For embodiments of the sheet 10 where the sheet waveguides 22 are formed closer the middle of the body 11, the smooth section 136 can be formed in the middle of the body 11 where the sheet waveguides 22 reside so that the waveguide end surfaces 126 reside within the smooth section after singulating the sheet 10, as shown in the example substrate 110 of FIG. 5B.

In experiments, a "sample" substrate was prepared by using the singulation methods described herein while a "reference" substrate was prepared by conventional cutting and then polishing to form polished waveguide end surfaces. In the sample substrate, the waveguide end surfaces resided within a smooth section as described above. The waveguides of the sample and reference substrates were then optically coupled to other waveguides and the coupling loss measured. It was found that there was no substantial difference in the coupling loss between the sample and reference substrates, indicating that the smooth section of the sample substrate had optical quality, i.e., was sufficiently smooth for optical coupling applications.

Figure 6A:
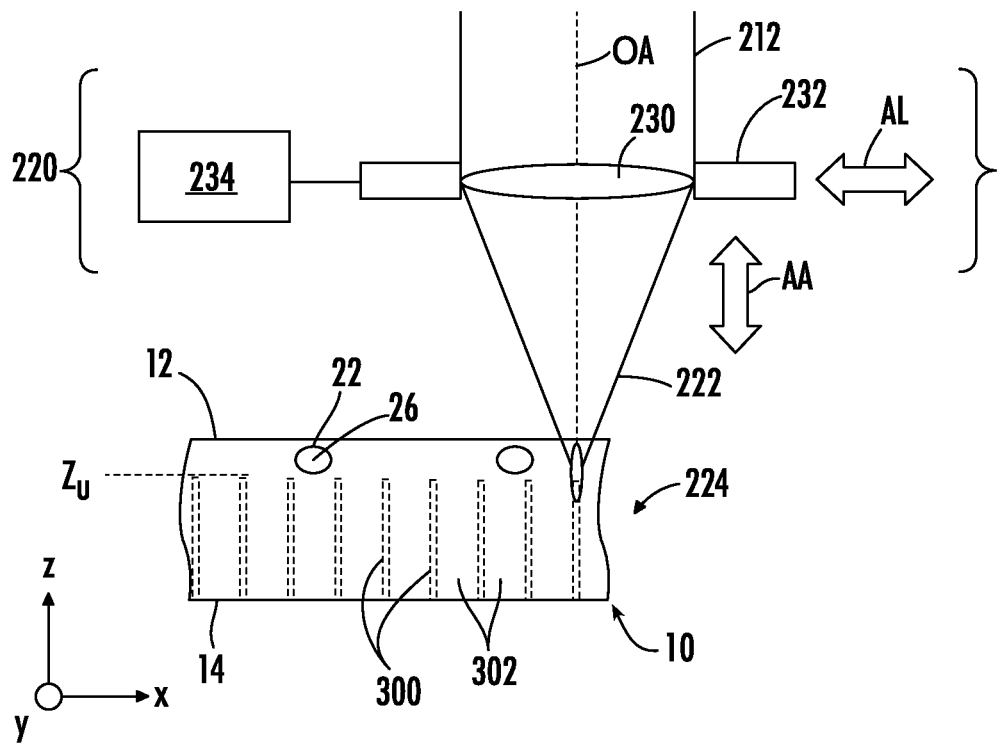
FIGS. 6A and 6B are close-up y-z cross-sectional views of a portion of the optical waveguide sheet and the focusing optical system of the laser-based optical processing system showing an example method of forming the modified regions in a manner that avoids the sheet waveguides that reside close to the top surface.
Figure 6B:
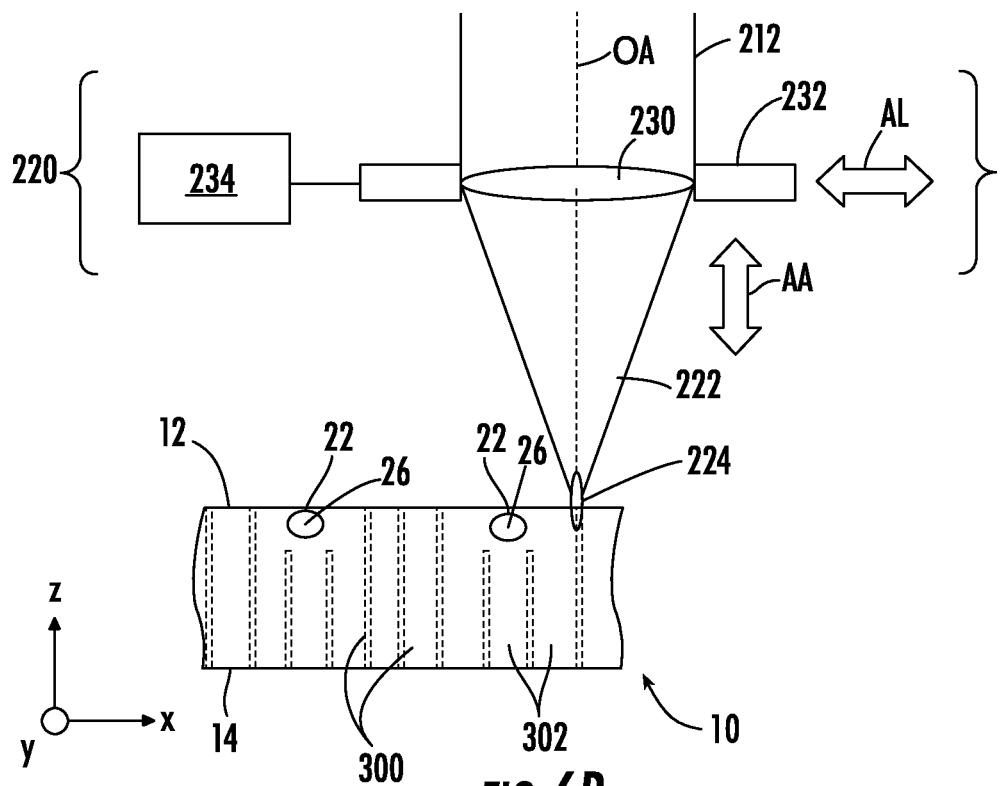

FIGS. 6A and 6B are similar to FIGS. 3A through 3C and show an example singulation method wherein the modified regions 300 vary in size to define unmodified sections 312 around the sheet waveguides 22. This can be accomplished by performing a single pass by translating the focused laser beam 222 to a position $z_U$ (FIG. 6A) in the region around the substrate waveguides 22. In an alternative approach a first pass with the focused laser beam 222 starting at initial positions $z_U$ (FIG. 6A), and then making a second pass with the focused laser beam to process addition portions of the sheet 10 where the sheet waveguides 22 do not reside. This forms a "square wave" pattern where the unmodified sections 312 are formed at the locations of the substrate waveguides 22, which are proximate the surface 12 of the sheet 10.

Figure 6C:
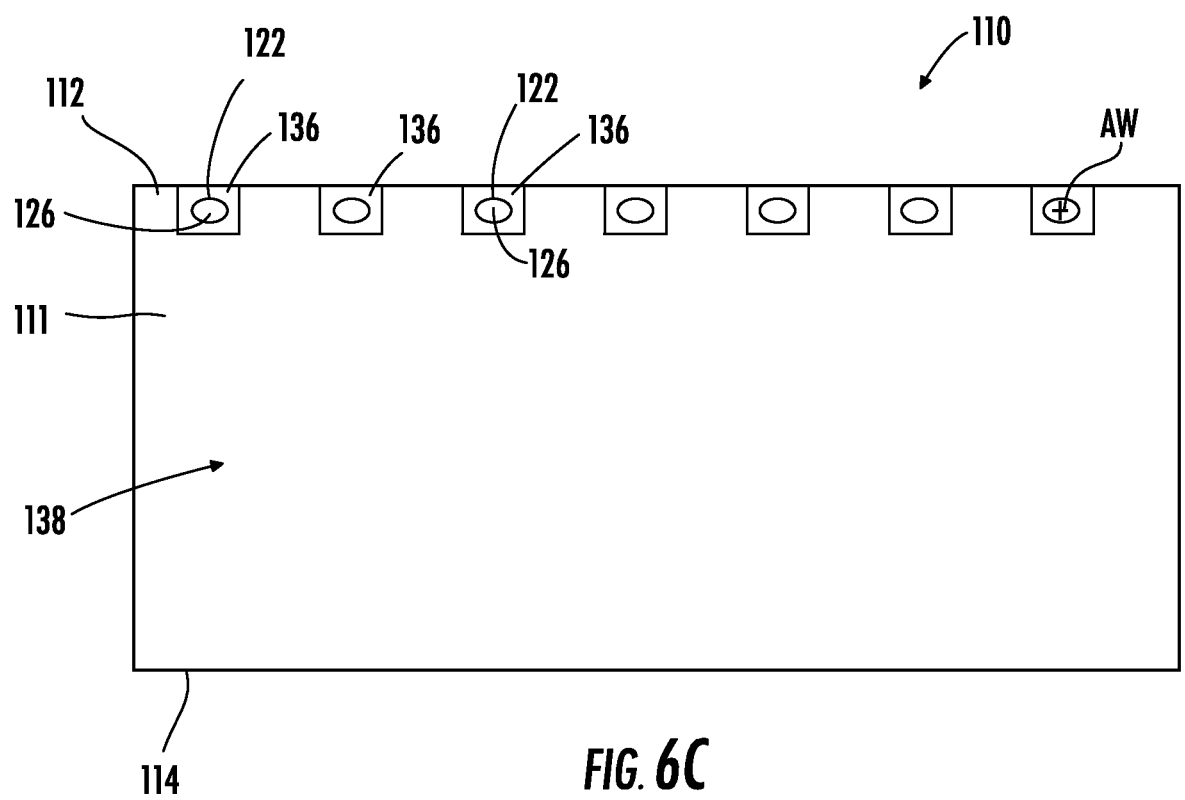
FIG. 6C is similar to 5A and shows the resulting front end face of the optical waveguide substrate after singulation, with the substrate waveguide end surfaces reside within respective localized smooth sections.

FIG. 6C is similar to 5A and shows the resulting front end face 116 of the substrate 110 after singulation. The substrate waveguide end surfaces 126 reside in localized smooth sections 136 proximate the top surface 112 of the substrate 110, with intervening portions of the rough section 138 extending to the top surface.

Figure 7A:
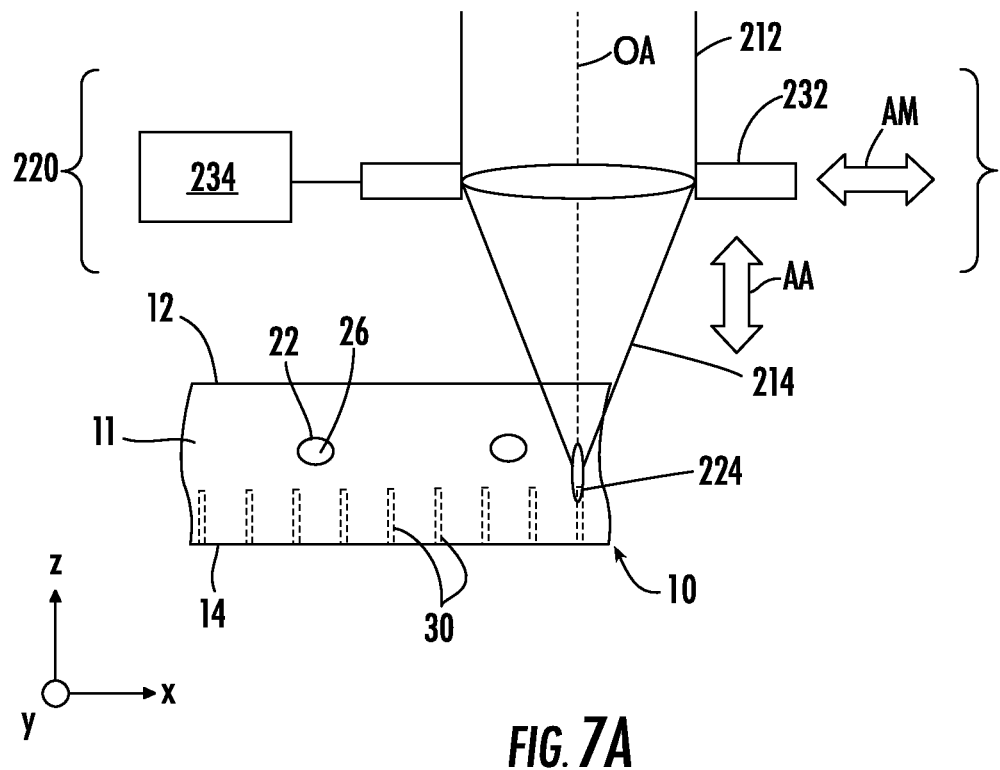
FIGS. 7A through 7C are similar to FIGS. 6A and 6B and show another example of forming the modified regions in a manner that avoids the sheet waveguides when the sheet waveguides are configured as buried waveguides.
Figure 7B:
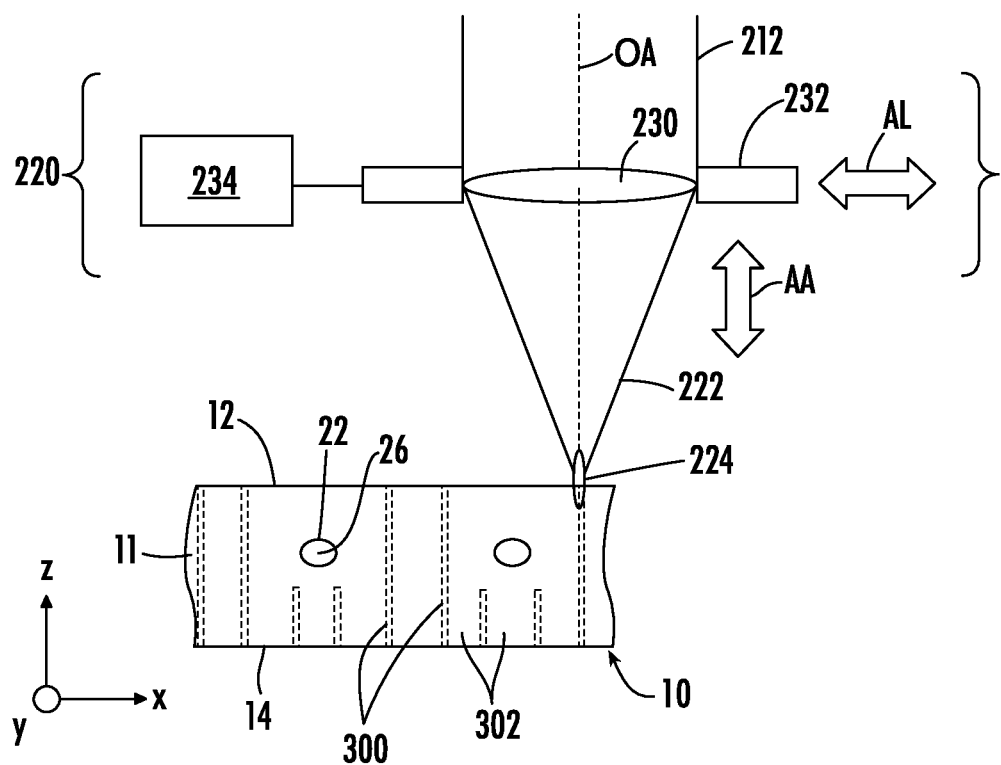
Figure 7C:
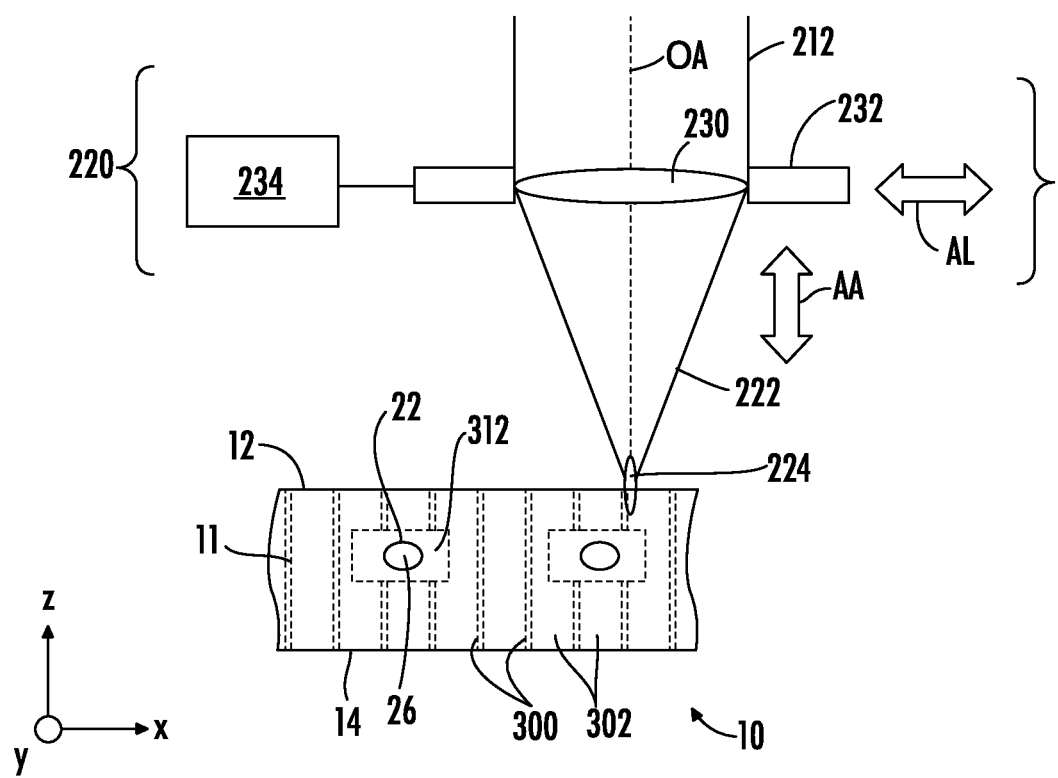

FIGS. 7A, 7B and 7C are similar to FIGS. 6A and 6B and illustrate an example singulation method wherein the waveguides 26 are buried (i.e., reside substantially below the top surface 12 within the body 11 of the sheet 10 and wherein the smooth sections 136 (FIG. 7D) are formed at the locations of the buried waveguides. The example method can be carried out in three steps. The first step is shown in FIG. 7A and involves forming relatively short initial modified regions 300 that extend into the body 11 of the sheet from the bottom surface 14.

The next step is shown in FIG. 7B and involves extending to the top surface 12 some of the initially formed modified regions 300 that do not reside beneath one of the sheet waveguides 22.

Figure 7D:
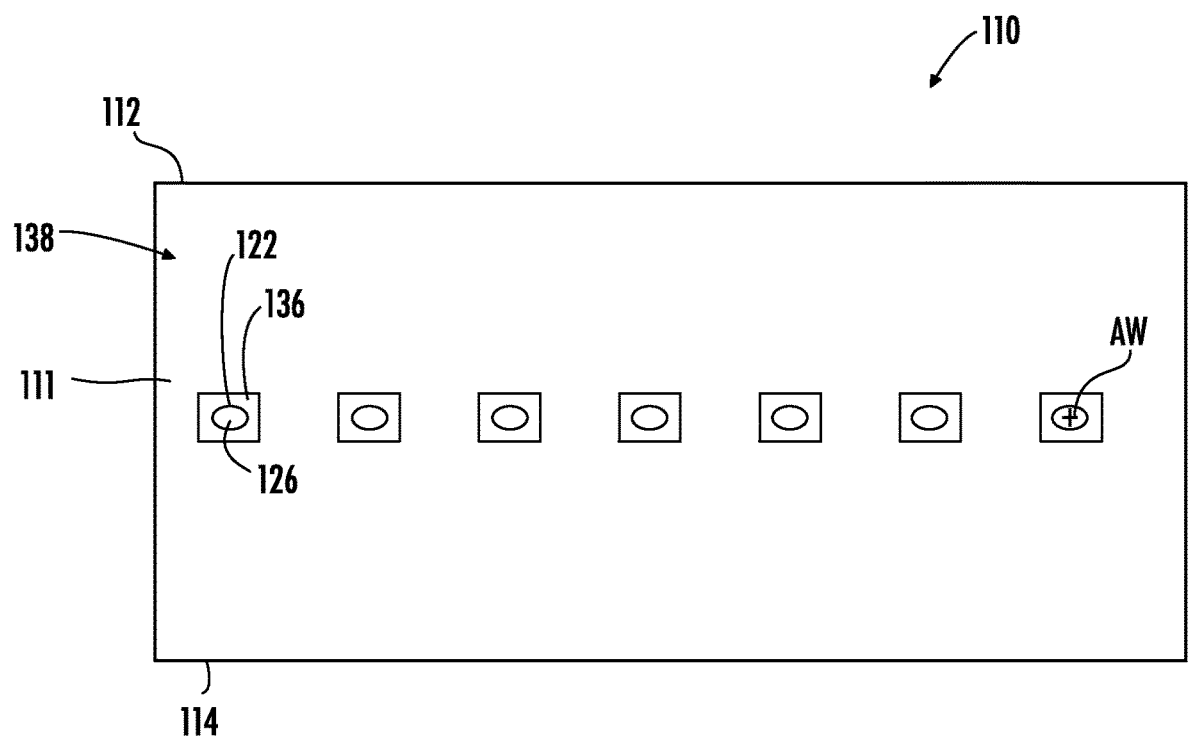
FIG. 7D is similar to 6C and shows the resulting front end face of the optical waveguide substrate after singulation, with the substrate waveguide end surfaces residing within localized smooth sections at or near the middle of the optical waveguide substrate.

The next step is shown in FIG. 7C and involves adding short modified regions 300 above the remaining initial modified regions 300 that reside beneath the sheet waveguides 22, starting above each sheet waveguide. The result upon singulation is shown in FIG. 7D, wherein the substrate 110 has smooth sections 136 that surround the substrate waveguide end surfaces 126 at or near the middle of the body 111 of the substrate 110. Note that while the separate smooth sections 136 have a rectangular shape, the modified regions 300 can also be formed in a manner that defines other shapes for the smooth sections.

Figure 8A:
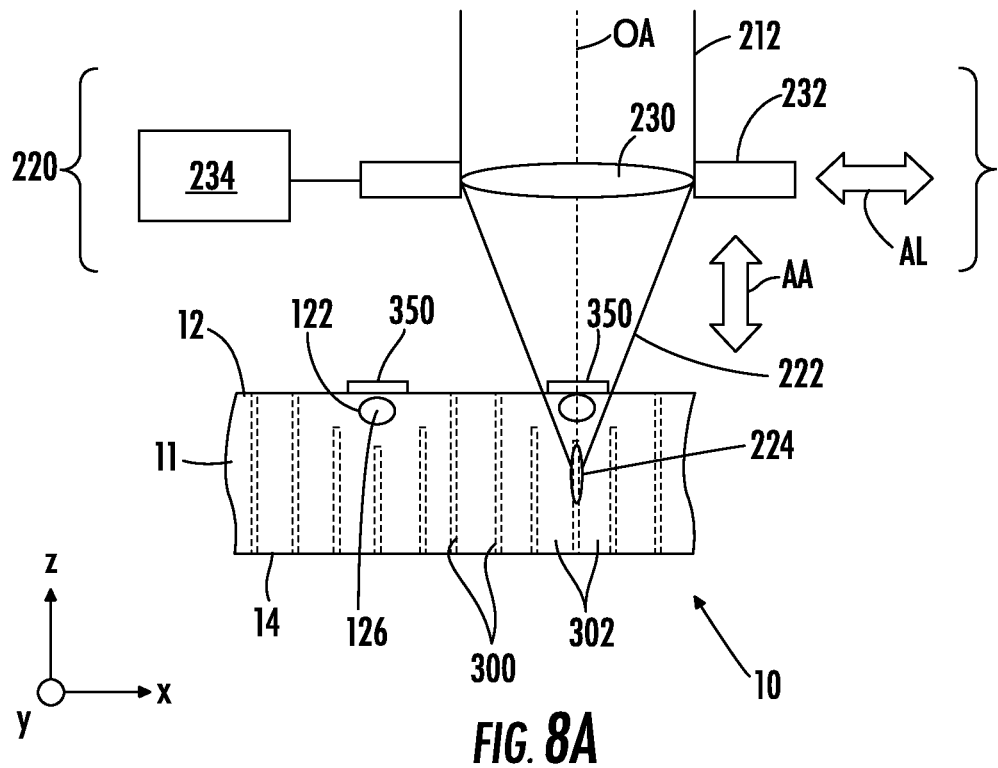
FIGS. 8A and 8B are close-up y-z cross-sectional views of a portion of the optical waveguide sheet and the focusing optical system illustrating two examples of how light-blocking elements can be used to prevent the focused laser beam from forming modified regions that traverse the sheet waveguides.
Figure 8B:
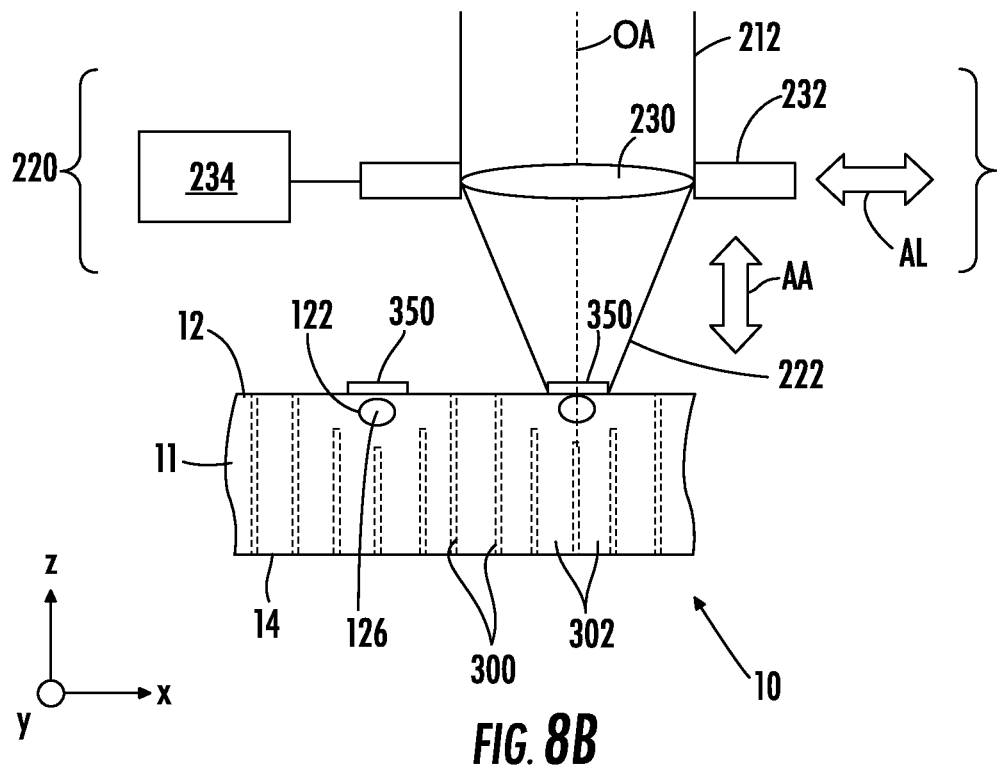

FIGS. 8A and 8B are similar to FIG. 6A and illustrate example methods of forming modified regions 300 wherein light-blocking elements 350 are disposed on the top surface 12 of the sheet 10 at the y-locations of (i.e., directly above) the sheet waveguides 22. The light-blocking elements 350 act to block a portion of the focused light beam 222 to prevent the focused light beam from having sufficient intensity at the locations of the sheet waveguides 22 to form a modified region there. The light-blocking elements 350 work particularly well when the focused laser beam 22 comprises a Bessel beams since such beams have unique focusing properties to impart laser modification far below light-blocking elements 350, as shown in FIG. 8A. For a Gaussian focused laser beam 222, the light-blocking elements tend to prevent modified regions from forming in the "shadow" of the light-blocking elements, as shown in FIG. 8B.

The use of light-blocking elements 350 can be used to define one or more modified sections 310 along with one or more unmodified sections 312 so that the waveguide end surfaces 126 can reside within respective smooth sections 136 when the sheet 10 is singulated to form the substrate 110.

Singulation Using Crack Propagation Control

An aspect of the singulation methods disclosed herein take advantage of what is known in the art as crack propagation control (CPC). An advantage of utilizing CPC is that the out of plane nature of the cracks CC is reduced. Because in CPC the cracks CC are in-plane, the edge spacing SE between modified regions 200 can be relatively large and the surface roughness Ra of the resulting end face can approach that of polished glass (e.g., Ra<<1 micron).

Figure 9:
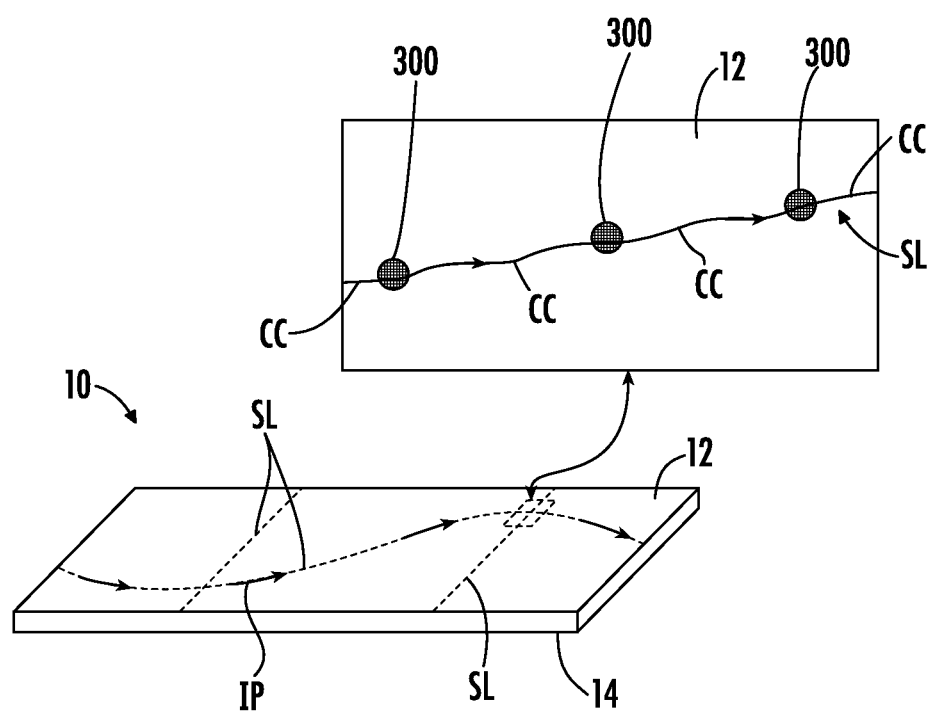
FIG. 9 is similar to FIG. 4 and shows an example where the modified regions are formed in a manner that allows the singulation lines to be formed using cracks that allow for crack propagation control during singulation.

FIG. 9 is similar to FIG. 4 and shows an example configuration of modified regions 300 formed to exploit CPC. Employing CPC for singulation includes forming the modified regions 300 as described above, but with certain conditions on the spacing SE. The CPC method utilizes cracks CC that extend in opposite directions from each modified region 300 to the adjacent modified region. If the pitch P is too large, the cracks CC cannot connect with each other, which make the mechanical break unpredictable. The arrows show the direction of crack propagation.

Figure 10A:
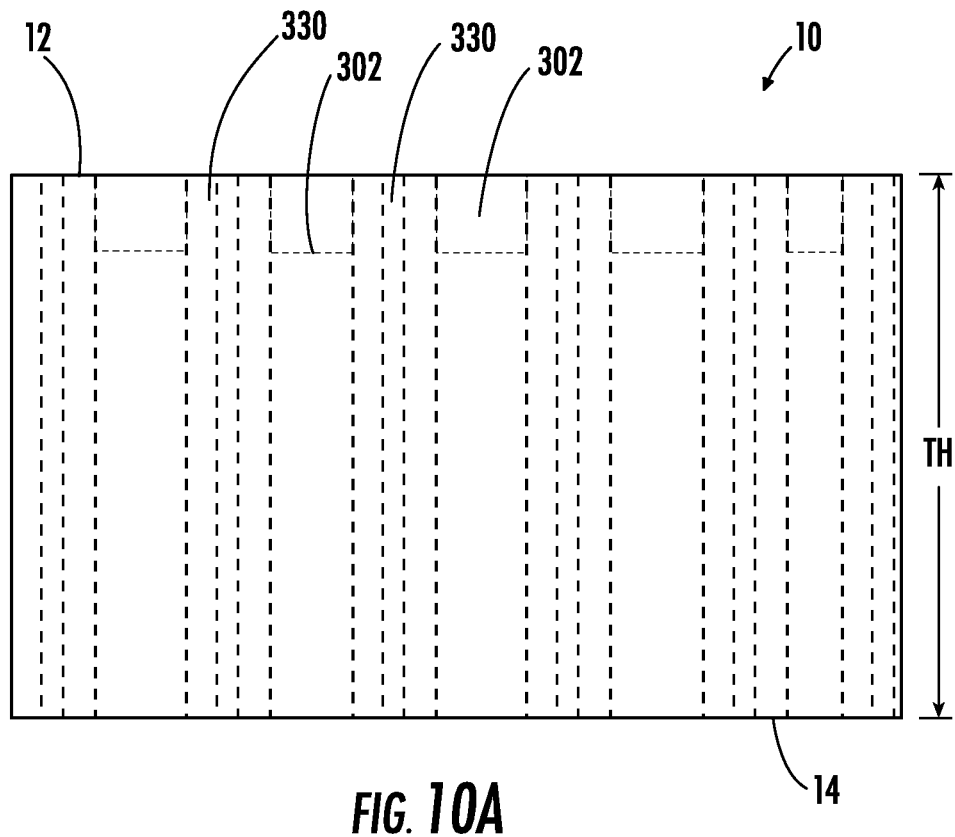
FIG. 10A is a cross-sectional view of an end face of an example plain glass sheet processed using the singulation methods disclosed herein, wherein the modified regions are separated by unmodified regions so that the end face includes smooth sections where the substrate end faces can reside upon singulation.

FIG. 10A is a cross-sectional view of an end face of an example plain glass sheet 10 of thickness TH=0.5 mm. The sheet 10 was singulated using CPC, wherein the modified regions 300 had a pitch P of 50 microns. This defined a singulation line SL with cracks CC each of length 50 microns extending between adjacent modified regions 300 and thus in an example through intervening unmodified regions 302. The end face 16 shows the resulting rough sections 138 and smooth sections 136, noting that the smooth sections are where sheet waveguides 22 can be located. By choosing a 50 micron pitch P between modified regions 300, a standard fiber array and connector interface pitch (e.g., 250 microns) can be achieved. In an example, the singulation line SL has a linear density p of modulation regions 300 in the range from 5 per millimeter to 500 per millimeter.

Figure 10B:
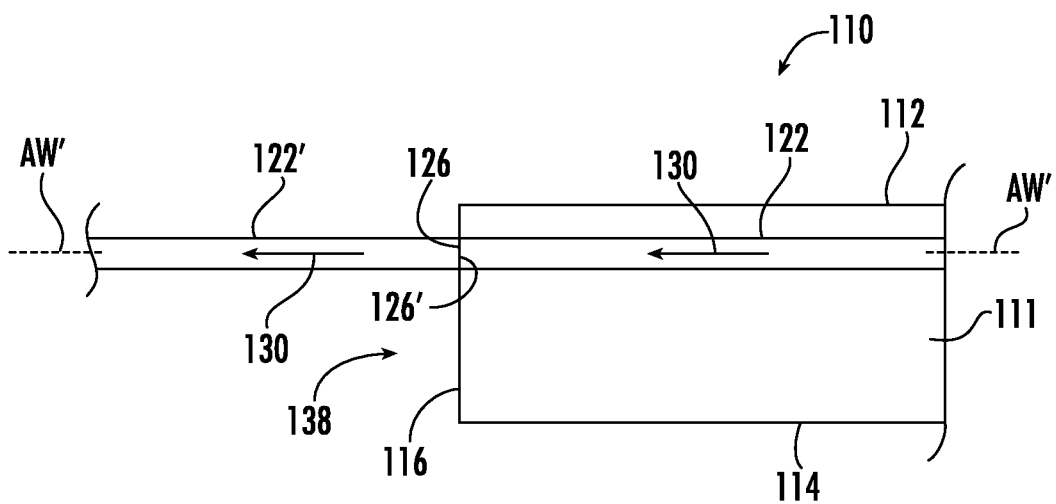
FIG. 10B is a close-up cross-sectional view of an example optical waveguide substrate showing guided light being optical coupled from one of the substrate waveguides to another optical waveguide through the end surface of the substrate waveguide.

FIG. 10B is a close-up cross-sectional view of an example optical waveguide substrate 110 showing guided light 130 being optical coupled from one of the substrate waveguides 122 to another optical waveguide 122' through the end surface 126 of the substrate waveguide and an end surface 126' of the optical waveguide 122'. The optical waveguide 122' has a waveguide axis AW'.

In an example, the end surfaces 126 and 126' are confronting and aligned, e.g., with the respective waveguide axes AW and AW' being coaxial, and with substantially no relative tilt between the end surfaces. In an example, the end surface 126 and 126' are in contact or are in contact in the presence of an index-matching fluid to reduce reflection loses. In an example, the optical waveguide 122' has substantially the same configuration as the substrate waveguide 122. In this example, since the end surface 126 of the substrate waveguide 122 resides in a smooth section 136 of the front end face 116, the coupling loss of the optical coupling of the guided light 130 can be relatively low, e.g., less than 1 dB or less than 0.5 dB.

Free-Form Singulation

The singulation methods disclosed herein allow for the sheet 10 to be cut into one or more substrates 100 having essentially an arbitrary outline shape. This is referred to as free-form singulation. A select outline shape for a substrate 110 is defined by placing the modified regions 300 along a cutline SL having a desired shape. As mentioned above, the mechanical breaking can be assisted by heating e.g., irradiating with a localized focused $CO_2$ laser beam to use the thermo-mechanical stress of thermal expansion. In an example, the glass-based materials used for the sheet 10 for free-form singulation preferably have a coefficient of thermal expansion (CTE) in the range of 3 K/ppm to 9 K/ppm.

Figure 11A:
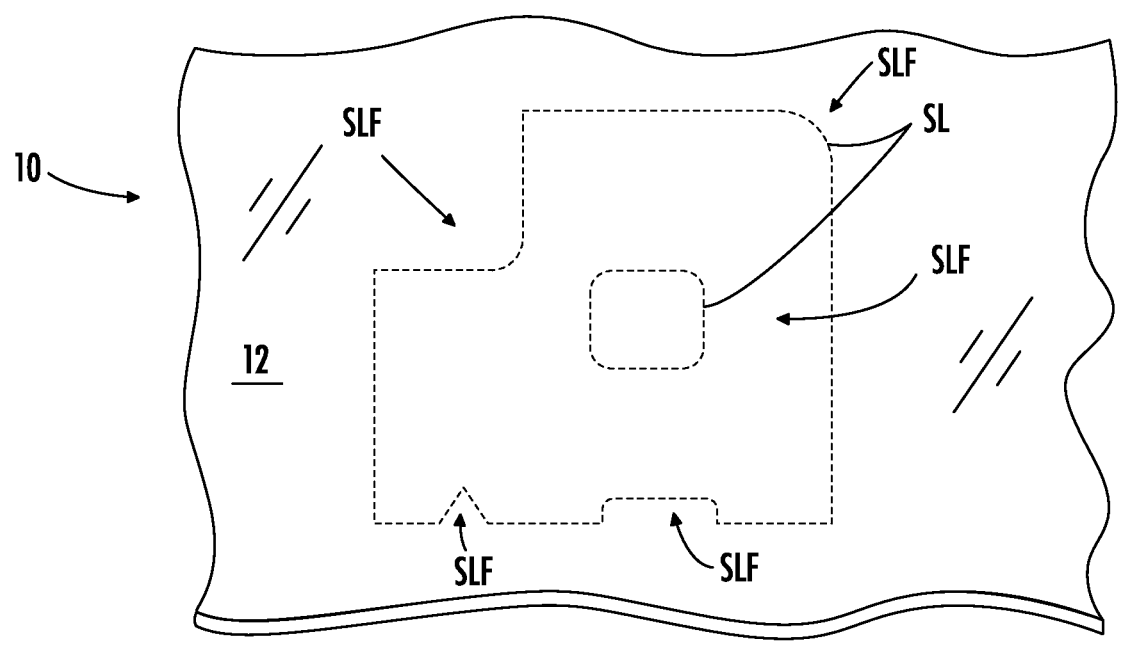
FIG. 11A is a top-down view of a portion of the optical waveguide sheet illustrating an example singulation line that includes cut-line features for forming shaped features in the singulated substrates.

FIG. 11A is a top-down view of a portion of the sheet 10 illustrating an example singulation line SL that includes cut-line features SLF for forming singulated substrates 100 having shaped features.

Figure 11B:
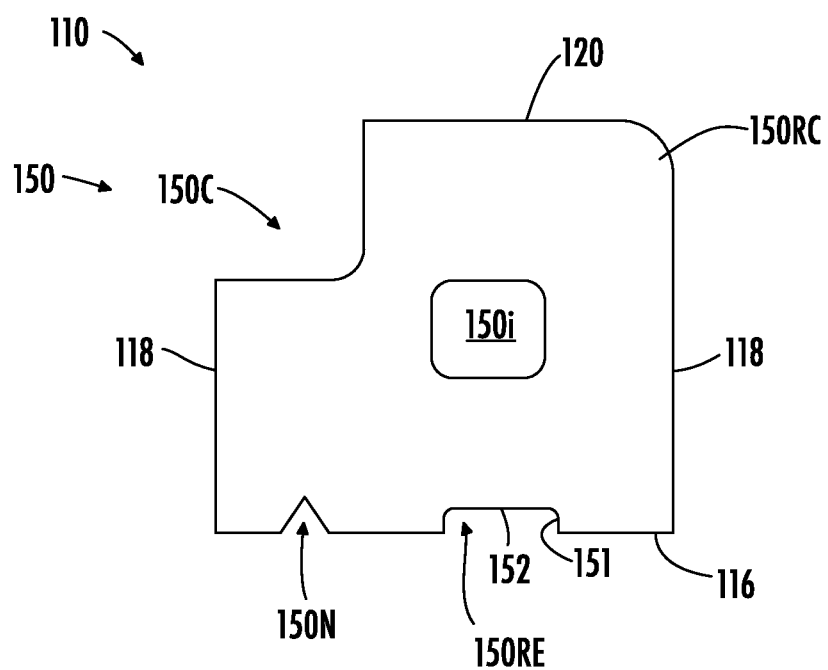
FIG. 11B is a top-down view of an example waveguide substrate formed based on the singulation line of FIG. 11A and showing example shaped features that can be defined using the free-form singulation methods disclosed herein.

FIG. 11B is a top-down view of an example substrate 110 formed from the sheet 10 of FIG. 11A using the singulation line SL shown therein. The example substrate 100 has a number of different shaped features 150, such as a cut-out corner 150C, a rounded corner 150RC, an inside cut-out 150i, a notch 150N and a recess 150RE, as defined by the corresponding cut-line features SLF. Depending on the application for the substrate 100, not all edges and sides require optical end-face quality. The optical quality only matters for the cross-sectional area where the waveguide end surfaces 26 reside. The benefits of adding one or more shaped features 150 to the end face 116 where the waveguide end surfaces 126 reside is that the one or more shaped features can serve as one or more alignment features and/or one or more securing features for other components such as optical components (e.g., lenses, lens assemblies, etc.) or mechanical components (e.g., connector, connector part, etc.).

Figure 12A:
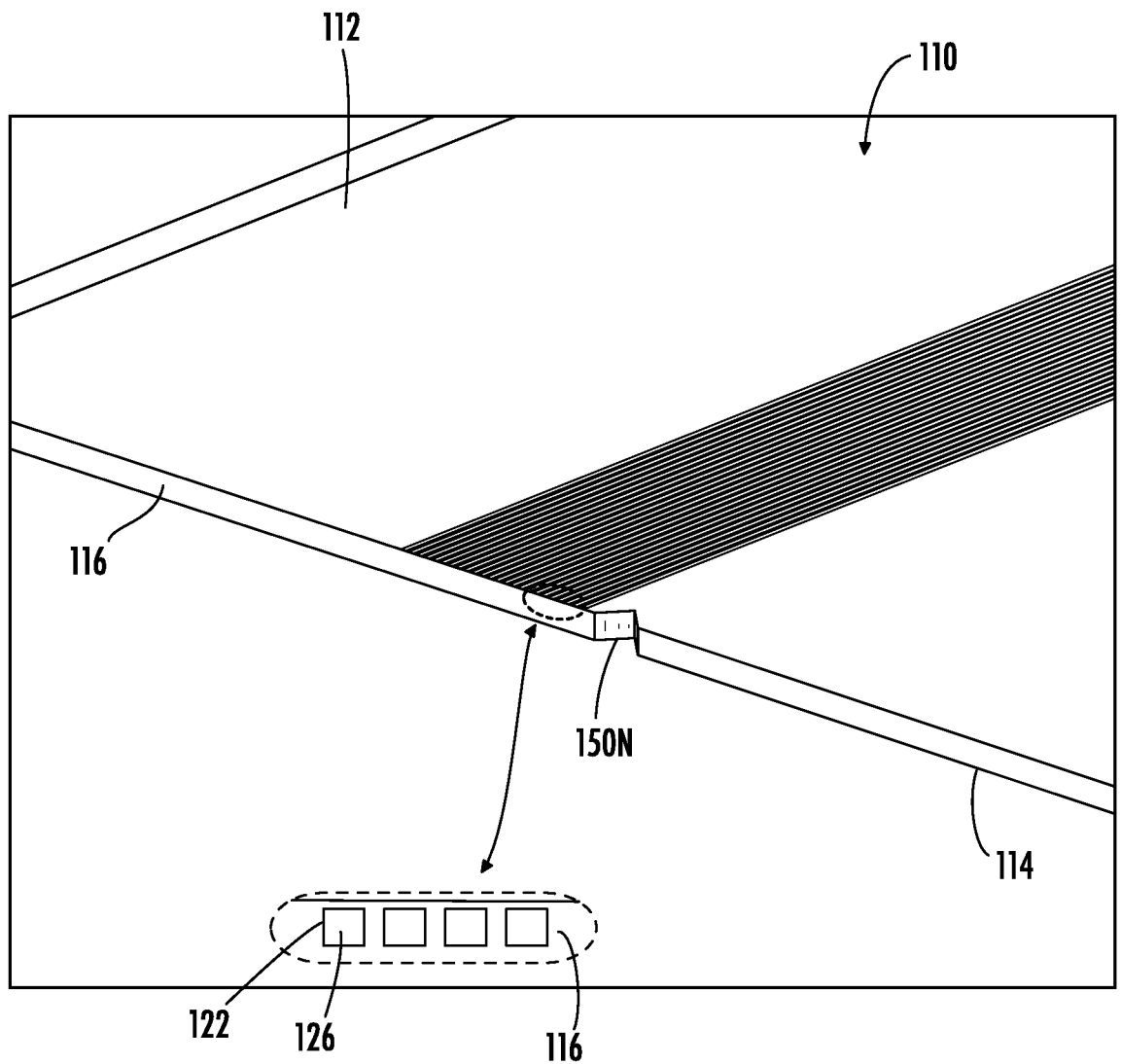
FIG. 12A is a close-up elevated view and FIG. 12B is a top-down view of an end portion of an example optical waveguide substrate that includes an alignment feature in the form of a notch in the front end face adjacent the substrate waveguides.
Figure 12B:
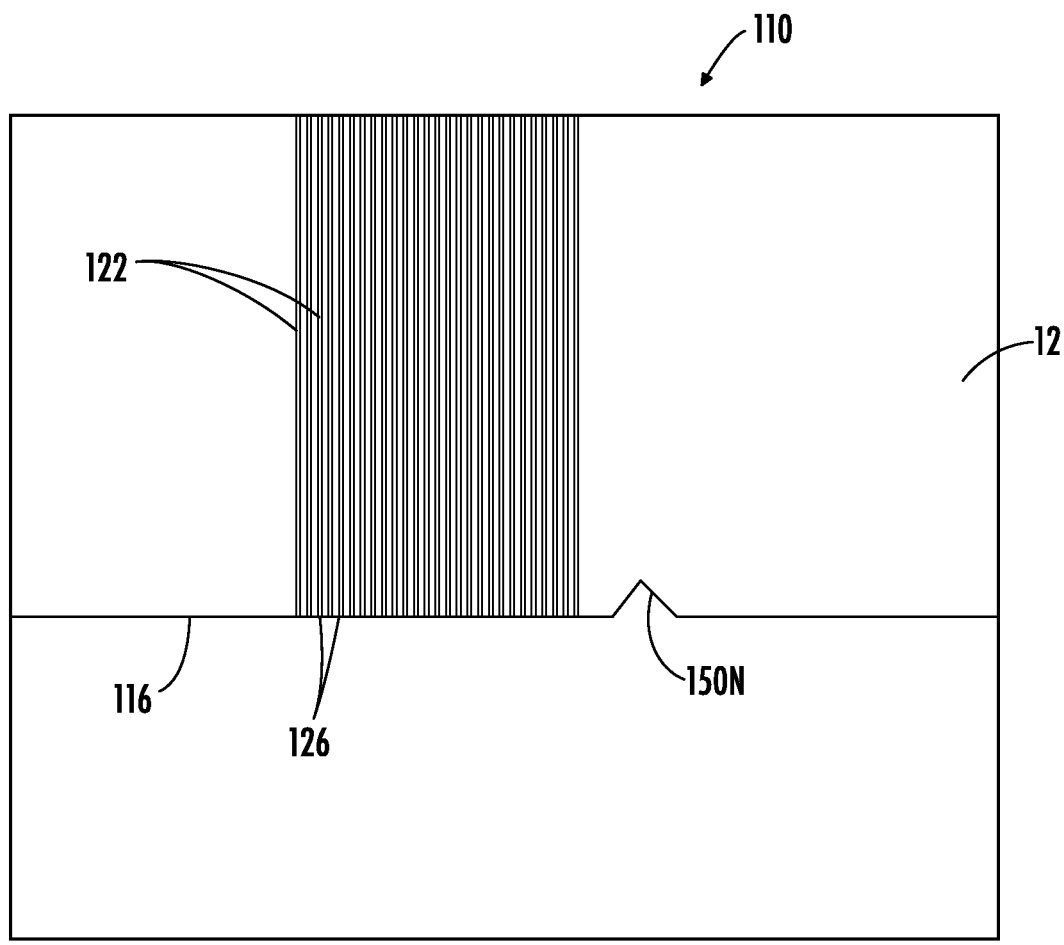

FIG. 12A is a close-up elevated view and FIG. 12B is a top-down of an end portion of an example substrate 110. The example substrate 110 that shows example substrate waveguides 122 array with end surfaces 126 at the substrate front end face 116. A notch 150N is formed in the front end face 116 adjacent (to one side) of the waveguide end surfaces using the singulation methods described above. The notch 150N is formed at a set distance from the edge-most waveguide 122 and can serve an alignment feature.

Figure 12C:
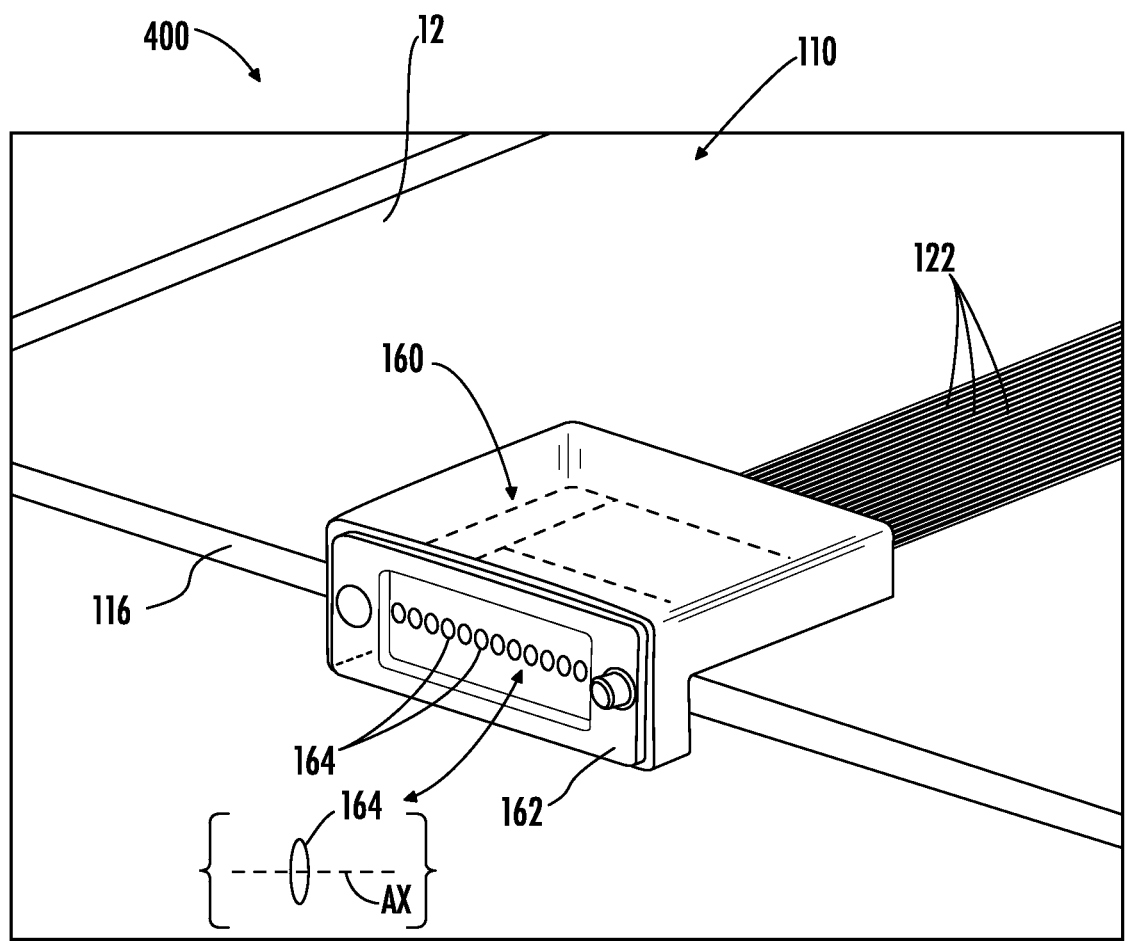
FIG. 12C is similar to FIG. 12A and shows an example connector part added to the optical waveguide substrate and aligned to the substrate waveguides using the notch alignment feature.
Figure 12D:
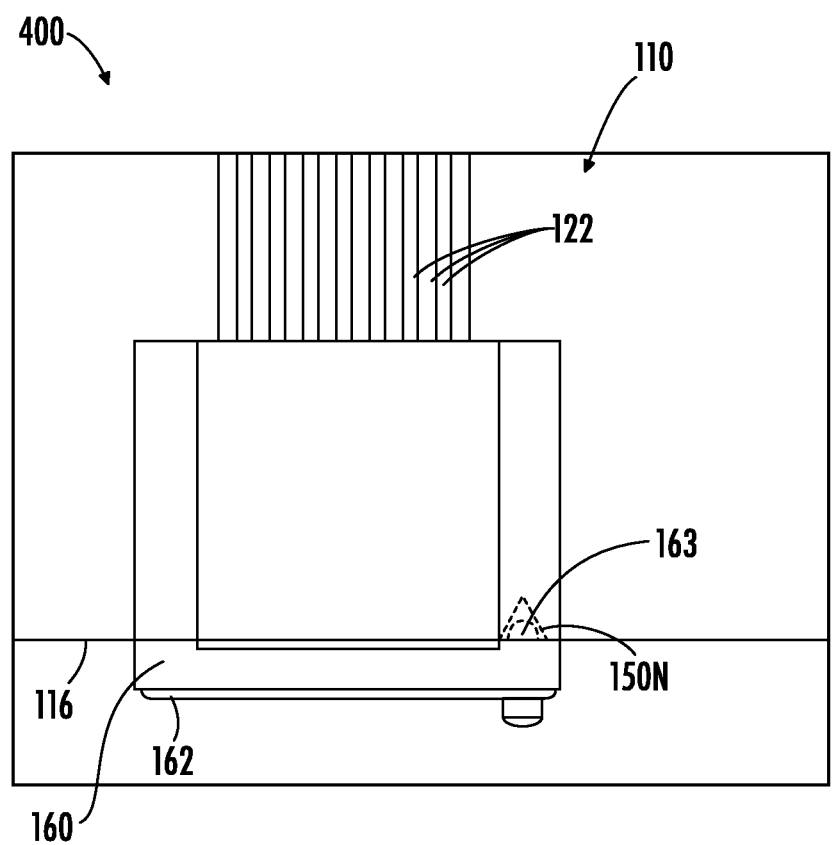
FIG. 12D is similar to FIG. 12B and shows a top-down view of the optical waveguide substrate with the example connector part operably arranged therewith.

FIG. 12C is similar to FIG. 12A and shows the addition of a connector part 160 to the front end face 116 of the substrate 120 to define a micro-optical device 400. FIG. 12D is a top-down view of the example micro-optical device 400 formed by the substrate 110 and connector part 160. The connector part has a front end 162 and an alignment feature 163. FIG. 12D illustrates how the notch 150N receives the alignment feature 163 (in the form of a protrusion that at least partially fits within the notch) to establish passive alignment.

In an example, the connector part 160 comprises a lensed receptacle (plug) wherein the front end 162 supports an array of lenses 164 each having an optical axis AX. The connector part 160 can have a counterpart to which it operably engages to establish optical communication. In an example, the lens receptacle connector part 160 is configured as a receptacle or plug and a counterpart lens plug or receptacle that aligns the optical axes AX of the lenses 164 with respective waveguide axes AW of the substrate waveguides 122 when the plug and receptacle are operably engaged.

Figure 13A:
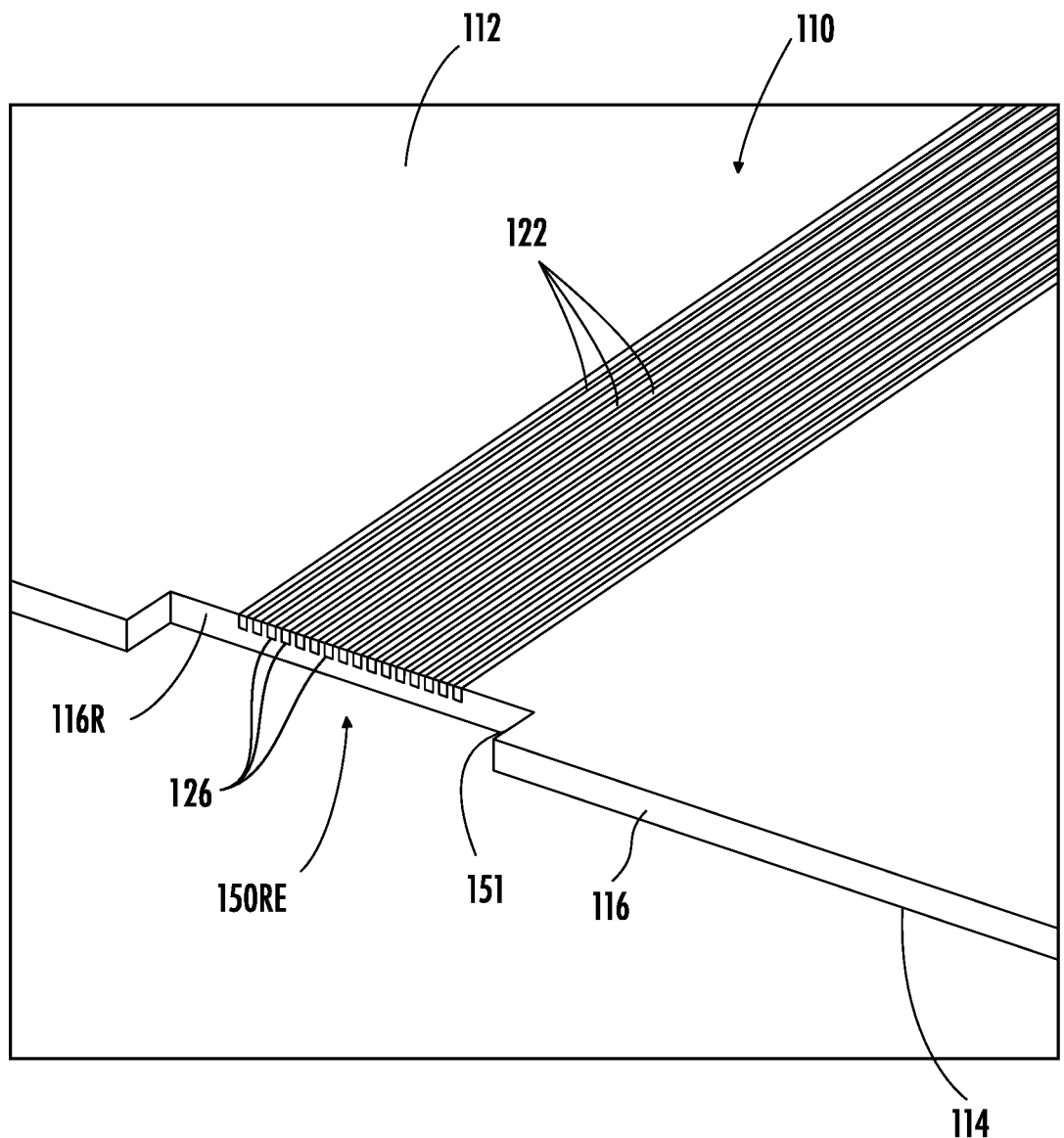
FIG. 13A is similar to FIG. 12A and shows an example edge recess formed in the front end face at the location of the substrate waveguides.
Figure 13B:
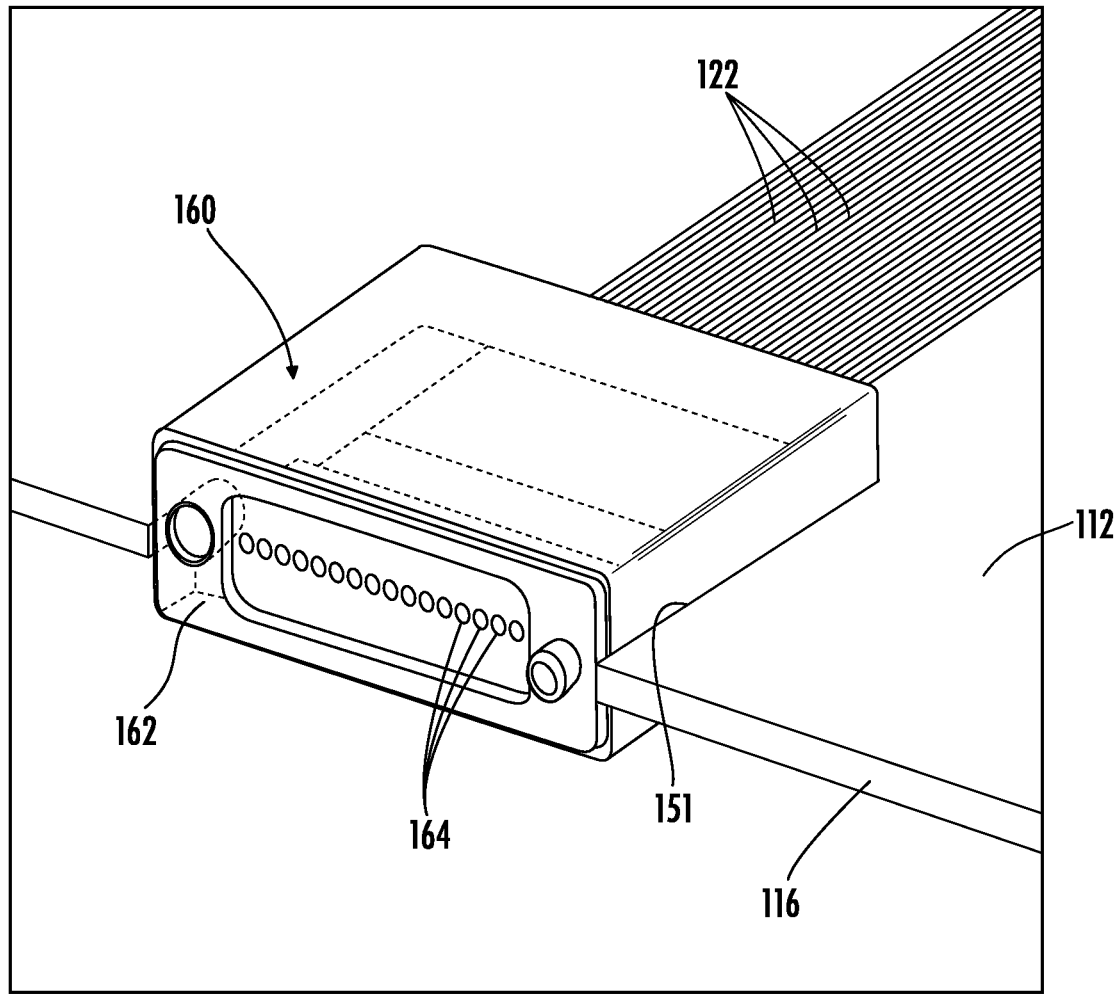
FIG. 13B is similar to FIG. 13A and additionally includes the connector part operably arranged within the edge recess.

FIG. 13A is similar to FIG. 12A and shows an example substrate 110 wherein the singulation process was used to form a recess 150R in the front end face 116 in the region where the substrate waveguides 122 reside. The recess 150R includes two sides 151 and an end wall 152. In an example, the recess 150RE is sized so that the connector part 160 has its front end 162 flush with the front end face 116 of the substrate 110, as shown in FIG. 13B. In this embodiment, at least one of the two sides 151 of the substrate as defined by the edge recess 150R can serve as an alignment feature by pushing the connector part 160 against the given side 151. The waveguide end surfaces 126 reside at the end wall 152 of the recess, i.e., the end wall 152 defines a recessed end face 116 of the substrate 110.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming a singulation line in an optical waveguide sheet, the optical waveguide sheet comprising a body that defines opposite first and second surfaces and that supports at least one sheet optical waveguide at a waveguide location, the method comprising:
   irradiating the optical waveguide sheet with a focused laser beam at discrete locations along an irradiation path by passing the focused laser beam through the first surface at the discrete locations to form spaced apart modified regions that extend from at least one of the first surface and the second surface and into the body of the optical waveguide sheet, wherein the spaced apart modified regions define at least one modified section of the optical waveguide sheet;
   leaving at least one section of the optical waveguide sheet along the irradiation path at the waveguide location unmodified to define at least one unmodified section, wherein the singulation line is formed by the at least one modified section and the at least one unmodified section of the optical waveguide sheet; and
   separating the optical waveguide sheet along the singulation line to form an optical waveguide substrate comprising:
      an end face residing substantially at the location of the singulation line and having at least one first section with a first surface roughness at the at least one unmodified section and a second section with a second surface roughness at the at least one modified section, wherein the second surface roughness is greater than the first surface roughness as measured by a surface standard according to ASME B46.1; and
      at least one substrate optical waveguide constituted by a section of the at least one sheet optical waveguide, the at least one substrate optical waveguide comprising opposite first and second surfaces and a waveguide end surface at the at least one first section of the end face.

2. The method according to claim 1, wherein the focused laser beam comprises a quasi-non-diffracting laser beam.

3. The method according to claim 1, wherein said irradiating includes removing at least a portion of the body of the optical waveguide sheet in forming the spaced apart modified regions.

4. The method according to claim 3, wherein said removing includes forming at least one of the spaced apart modified regions as a perforation.

5. The method according to claim 1, wherein the singulation line comprises a straight portion.

6. The method according to claim 1, wherein the singulation line comprises a curved portion.

7. The method according to claim 1, wherein the spaced apart modified regions comprise a pitch P from 1 micron to 500 microns.

8. The method according to claim 7, wherein the pitch P is from 5 microns to 100 microns.

9. The method according to claim 1, wherein each of the spaced apart modified regions has a diameter DR from 0.1 to 10 microns.

10. The method according to claim 1, wherein the optical waveguide sheet has a rectangular shape.

11. The method according to claim 1, wherein the optical waveguide sheet comprises either a fully chemically strengthened glass or a locally chemically strengthened glass.

12. The method according to claim 1, wherein the optical waveguide sheet has a thickness TH, the focused laser beam defines a focus region having an axis and an axial length LR, wherein LR≥TH, and the focus region either remains axially stationary when forming each of the spaced apart modified regions or moves axially when forming each of the spaced apart modified regions.

13. The method according to claim 1, wherein the optical waveguide sheet has a thickness TH, the focused laser beam defines a focus region having an axis with an axial length LR, wherein LR<TH, and the focus region moves axially when forming each of the spaced apart modified regions.

14. The method according to claim 1, wherein at least one of the spaced apart modified regions is formed by moving a focus region at least once through the body of the optical waveguide sheet.

15. The method according to claim 1, wherein at least one of the spaced apart modified regions is formed by moving a focus region at least once through the body of the sheet from a position within the body of the sheet to either the first surface or the second surface.

16. The method according to claim 1, further comprising disposing at least one light-blocking element on the first surface of the sheet above the waveguide location to prevent the focused light beam from forming a modified region at the waveguide location.

17. The method according to claim 1, wherein the first surface roughness of the first section is defined by an average surface roughness Ra<0.01 micron.

18. The method according to claim 17, wherein the second surface roughness of the second section is at least 10% greater than the first surface roughness.

19. The method according to claim 17, wherein the second surface roughness of the second section is at least twice as large as the first surface roughness of the at least one first section.

20. The method according to claim 17, wherein the second surface roughness of the second section is at least ten time larger than the first surface roughness of the at least one first section.

21. The method according to claim 1, wherein the at least one substrate optical waveguide comprises multiple substrate optical waveguides, and wherein the multiple substrate optical waveguides define respective multiple waveguide end surfaces that reside within the at least one first section of the end face of the optical waveguide substrate.

22. The method according to claim 21, wherein the multiple substrate optical waveguides and the at least one first section reside proximate the first surface of the optical waveguide substrate.

23. The method according to claim 21, wherein the multiple substrate optical waveguides and the at least one first section reside substantially in the middle of the body of the optical waveguide substrate.

24. The method according to claim 21, wherein the at least one unmodified section comprises multiple unmodified sections and the at least one first section comprises multiple first sections defined by multiple unmodified sections, with one or more of the waveguide end surfaces of the multiple substrate optical waveguides residing in each of the unmodified sections.

25. The method according to claim 1, wherein the at least one unmodified section comprises no more than 60% of a total end face area comprising the at least one unmodified section and the at least one modified section.

26. The method according to claim 1, further comprising: forming cracks between the spaced apart modified regions and through at least one unmodified region therebetween, and wherein the cracks undergo crack propagation control during said separating.

27. The method according to claim 1, wherein the singulation line includes at least one cut-line feature that defines at least one shaped feature in the optical waveguide substrate.

28. The method according to claim 27, wherein the at least one shaped feature is selected from the group of shaped features comprising; a corner cut out, a rounded corner, an inside cut out, a notch, and a recess.

29. The method according to claim 27, wherein the at least one shaped feature defines a first alignment feature for aligning a component to the at least one substrate optical waveguide.

30. The method according to claim 27, further comprising operably engaging the component with the optical waveguide substrate and comprising a second alignment feature that operably engages the first alignment feature.

31. The method according to claim 30, wherein the component comprises at least one optical element that aligns with the at least one substrate optical waveguide of the optical waveguide substrate when the first and second alignment features are operably engaged.

32. The method according to claim 31, wherein the at least one optical element comprises either at least one component optical waveguide or at least one component lens element.

33. The method according to claim 30, wherein the component comprises at least one mechanical element that aligns with the at least one substrate optical waveguide when the first and second alignment features are operably engaged.

34. The method according to claim 1, wherein said separating comprises applying heat to the singulation line.

35. The method according to claim 34, wherein said applying heat comprises irradiating the singulation line with an infrared laser beam.

36. The method according to claim 1, further comprising optically coupling the at least one substrate optical waveguide to an optical waveguide through the waveguide end surface, wherein the waveguide end surface contributes less than 1 dB to an optical coupling loss between the at least one substrate optical waveguide and the optical waveguide.

37. The method according to claim 1, further comprising optically coupling the at least one substrate optical waveguide to an optical waveguide through the waveguide end surface, wherein the waveguide end surface contributes less than 0.5 dB to an optical coupling loss between the at least one substrate optical waveguide and the optical waveguide.

38. A method of singulating an optical waveguide sheet, the optical waveguide sheet comprising a body that defines first and second opposite surfaces and that supports a plurality of sheet waveguides, the method comprising:

forming in the body of the optical waveguide sheet spaced apart modified regions at discrete locations along an irradiation path using a focused laser beam comprising optical pulses with a temporal pulse width of less than 100 picoseconds directed through the first surface to define a singulation line that crosses the plurality of sheet waveguides, wherein the spaced apart modified regions do not intersect any of the plurality of sheet waveguides;

separating the optical waveguide sheet along the singulation line to form an optical waveguide substrate comprising an end face and that further comprises sections of the plurality of sheet waveguides that define substrate optical waveguides each having a waveguide end surface that resides at the end face, wherein the substrate end face comprises a first section at which the waveguide end surfaces reside and a second section at which the waveguide end surfaces do not reside; and wherein first and second sections comprise respective first and second average surface roughnesses, and wherein the second average surface roughness is at least two times greater than the first average surface roughness as measured by a surface standard according to ASME B46.1.

39. The method according to claim 38, wherein the first average surface roughness is less than 0.05 micron.

40. The method according to claim 38, wherein the first average surface roughness is less than 0.01 micron.

41. The method according to claim 38, wherein the focused laser beam comprises a quasi-non-diffracting laser beam.

42. The method according to claim 38, wherein said separating comprises applying stress to the singulation line using at least one of: a mechanical force and heat from a laser beam.

43. The method according to claim 38, wherein the singulation line comprises a curved portion.

44. The method according to claim 38, wherein each of the spaced apart modified regions has a diameter DR in the range from 0.1 to 10 microns.

45. The method according to claim 38, further comprising optically coupling a given one of the substrate optical waveguides to an optical waveguide through the waveguide end surface of the given one of the substrate optical waveguides, wherein waveguide end surface of the given one of the substrate optical waveguides contributes less than 1 dB to an optical coupling loss between the given one of the substrate optical waveguides and the optical waveguide optically coupled thereto.

46. The method according to claim 38, further comprising optically coupling a given one of the substrate optical waveguides to an optical waveguide through the waveguide end surface of the given one of the substrate optical waveguides, wherein waveguide end surface of the given one of the substrate optical waveguides contributes less than 0.5 dB to an optical coupling loss between the given one of the substrate optical waveguides and the optical waveguide optically coupled thereto.

47. The method according to claim 38, wherein the at first section of the substrate end face comprises no more than 60% of a total end face area comprising the first section and the second section of the substrate end face.

* * * * *

UNITED STATES PATENT AND TRADEMARK OFFICE
CERTIFICATE OF CORRECTION

PATENT NO.        : 11,054,574 B2
APPLICATION NO.   : 16/414199
DATED             : July 6, 2021
INVENTOR(S)       : Lars Martin Otfried Brusberg et al.

It is certified that error appears in the above-identified patent and that said Letters Patent is hereby corrected as shown below:

On the Title Page

Item [56], Line 3, delete "(2016." and insert -- (2016). --, therefor.

In the Claims

Column 18, Line 47, Claim 20, delete "ten time" and insert -- ten times --, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*